(12) United States Patent
St-Pierre et al.

(10) Patent No.: US 11,607,611 B2
(45) Date of Patent: Mar. 21, 2023

(54) MACHINE LEARNED RESOLUTION ENHANCEMENT FOR VIRTUAL GAMING ENVIRONMENT

(71) Applicant: PlayerUnknown Productions B.V., Amsterdam (NL)

(72) Inventors: David Lupien St-Pierre, Amsterdam (NL); Noel Lopez-Gonzaga, Arnhem (NL); Serge vanKeulen, Rotterdam (NL)

(73) Assignee: PlayerUnknown Productions B.V., Amsterdam (NL)

( * ) Notice: Subject to any disclaimer, the term of this patent is extended or adjusted under 35 U.S.C. 154(b) by 0 days.

(21) Appl. No.: 16/994,478

(22) Filed: Aug. 14, 2020

(65) Prior Publication Data
US 2021/0178263 A1   Jun. 17, 2021

Related U.S. Application Data

(60) Provisional application No. 62/946,960, filed on Dec. 11, 2019.

(51) Int. Cl.
| | |
|---|---|
| *A63F 13/52* | (2014.01) |
| *A63F 13/50* | (2014.01) |
| *A63F 13/69* | (2014.01) |
| *A63F 13/5378* | (2014.01) |
| *A63F 13/80* | (2014.01) |
| *G06K 9/62* | (2022.01) |

(Continued)

(52) U.S. Cl.
CPC .............. *A63F 13/52* (2014.09); *A63F 13/50* (2014.09); *A63F 13/5378* (2014.09); *A63F 13/69* (2014.09); *A63F 13/80* (2014.09); *G06K 9/6257* (2013.01); *G06N 3/0454* (2013.01); *G06T 17/05* (2013.01); *A63F 2300/8082* (2013.01)

(58) Field of Classification Search
CPC ....... A63F 13/50; A63F 13/52; A63F 2300/66
See application file for complete search history.

(56) References Cited

U.S. PATENT DOCUMENTS

| | | | |
|---|---|---|---|
| 6,319,129 B1* | 11/2001 | Igarashi | A63F 13/52 463/31 |
| 6,747,649 B1* | 6/2004 | Sanz-Pastor | G06T 17/00 345/428 |

(Continued)

OTHER PUBLICATIONS

Non-Final Rejection, Co-Pending U.S. Appl. No. 16/994,494, filed Jun. 8, 2022, 11 pp.

(Continued)

*Primary Examiner* — Chase E Leichliter
(74) *Attorney, Agent, or Firm* — Offit Kurman, P.A.; Chintan A. Desai

(57) ABSTRACT

Virtual game worlds for computer games can be provided using machine learning. The use of machine learning enables the virtual game worlds to be generated at run time by standard consumer hardware devices. Machine learning agents are trained in advance to the characteristics of the particular game world. Then, these suitably trained machine learning agents can be used to generate a relevant portion of a virtual game world, such as a portion of the virtual game world that is proximate to a play's position. Advantageously, the virtual game world can be provided in high resolution and is able to cover a substantially larger region than conventional practical.

22 Claims, 26 Drawing Sheets

(51) Int. Cl.
*G06N 3/04* (2023.01)
*G06T 17/05* (2011.01)

(56) References Cited

U.S. PATENT DOCUMENTS

| | | | | |
|---|---|---|---|---|
| 9,737,811 | B1* | 8/2017 | Penmatsa | A63F 13/35 |
| 9,751,005 | B1* | 9/2017 | Dong | A63F 13/5378 |
| 10,369,472 | B1* | 8/2019 | Mattar | A63F 13/35 |
| 10,726,611 | B1* | 7/2020 | Court | A63F 13/20 |
| 11,446,575 | B2* | 9/2022 | St-Pierre | G06N 3/0454 |
| 2005/0035964 | A1 | 2/2005 | Heenen | |
| 2005/0264576 | A1* | 12/2005 | Sommers | G06T 17/05 |
| | | | | 345/543 |
| 2013/0321442 | A1 | 12/2013 | Van Os et al. | |
| 2014/0007022 | A1* | 1/2014 | Tocino Diaz | G06F 3/017 |
| | | | | 715/863 |
| 2016/0332074 | A1* | 11/2016 | Marr | A63F 13/60 |
| 2017/0046882 | A1* | 2/2017 | Lane | G06F 3/048 |
| 2018/0345147 | A1* | 12/2018 | Okajima | G06T 19/20 |
| 2019/0251717 | A1 | 8/2019 | Liu et al. | |
| 2019/0340730 | A1* | 11/2019 | Dimitrov | G06T 3/4069 |
| 2019/0342555 | A1* | 11/2019 | Dimitrov | H04L 67/131 |
| 2020/0410741 | A1* | 12/2020 | Laflamme | A63F 13/52 |
| 2021/0001216 | A1 | 1/2021 | Sanders et al. | |
| 2021/0023448 | A1* | 1/2021 | Im | A63F 13/50 |
| 2021/0121781 | A1* | 4/2021 | Benedetto | A63F 13/67 |
| 2021/0178267 | A1 | 6/2021 | St-Pierre et al. | |
| 2021/0178270 | A1* | 6/2021 | Sun | A63F 13/56 |
| 2021/0178274 | A1 | 6/2021 | St-Pierre et al. | |

OTHER PUBLICATIONS

Karras et al., Progressive Growing of GANs for Improved Quality, Stability, and Variation, Published as a conference paper at ICLR, 2018, 26 pp.
Karras et al., A Style-Based Generator Architecture for Generative Adversarial Networks, Mar. 29, 2019, 12 pp.
Qui et al., Void Filling of Digital Elevation Models with a Terrain Texture Learning Model Based on Generative Adversarial Networks, Remote Sensing Journal, 2019, 22 pp., vol. 11, 2829.
Ronneberger et al., U-Net: Convolutional Networks for Biomedical Image Segmentation, May 18, 2015, 8 pp.
https://www.sidefx.com/docs/houdini/model/terrain_workflow.html., Realistic terrain with heightfields, 8 pp.
Ledig et al., Photo-Realistic Single Image Super-Resolution Using a Generative Adversarial Network, May 25, 2017, 19 pp.
He et al., Deep Residual Learning for Image Recognition, Dec. 10, 2015, 12 pp.
Sola et al., Image-to-Image Translation with Conditional Adversarial Networks, Nov. 26, 2018, 17 pp.
Harshit Kumar, Skip connections and Residual blocks, Sep. 7, 2018, 3 pp.

* cited by examiner

| Task | Algorithm | Input | Output |
|---|---|---|---|
| 1. Make Basemap | StyleGAN | Seed data | Basemap |
| 2. Split Basemap | Streaming quadtree | Basemap | Dynamic quadtree |
| 2.1 Increase Resolution of a Region | Modified SRGAN | Basemap tile | Enhanced resolution tile |
| 2.2 Place Tree Population | Modified pix2pix with Houdini input | Enhanced resolution tile | Tree population grid |
| 2.3 Ground Texture Population | Modified pix2pix with Houdini input | Map from 2.2 and Enhanced resolution tile | Splat map |
| 2.4 Ground Population Placement | Modified pix2pix with Houdini input | Map from 2.3 and Enhanced resolution tile | Splat map |
| 3. Gather data and visualize | | Outputs from 2.1-2.4 | Terrain |

FIG. 2A

| Task | Algorithm | Input | Output |
|---|---|---|---|
| 1.1 Make low-resolution basemap | ProGAN | Seed number | Low-resolution basemap |
| 1.2 Make high-resolution basemap | Modified pix2pix with Houdini input | Low-resolution basemap | High-resolution basemap |
| 2.1 Split Basemap | Streaming quadtree | Basemap | Dynamic quadtree (forms Basemap tiles) |
| 2.2 Increase Resolution of a Region | Modified SRGAN | Basemap tile | Increased resolution tile |
| 2.3 Population Placement | Population agent with Houdini input | Basemap tile and Increased resolution tile | Population grid map |
| 2.4 Ground Texture Population | Modified pix2pix with Houdini input | Population grid map and basemap tile | Splat map |
| 3. Gather data and visualize | | Outputs from 2.1-2.4 | Terrain |

| 1x | 1x | 1x | 1x | 1x | 1x | 1x | 1x |
|----|----|----|----|----|----|----|----|
| 1x | 1x | 1x | 1x | 1x | 1x | 1x | 1x |
| 1x | 1x | 1x | 1x | 1x | 1x | 1x | 1x |
| 1x | 1x | 1x | 1x | 1x | 1x | 1x | 1x |
| 1x | 1x | 1x | 1x | 1x | 1x | 1x | 1x |
| 1x | 1x | 1x | 1x | 1x | 1x | 1x | 1x |
| 1x | 1x | 1x | 1x | 1x | 1x | 1x | 1x |
| 1x | 1x | 1x | 1x | 1x | 1x | 1x | 1x |

| 1x | 1x | 1x | 1x | 1x | 1x | 1x | 1x |
|----|----|----|----|----|----|----|----|
| 1x | 1x | 1x | 1x | 1x | 1x | 1x | 1x |
| 1x | 1x | 1x | 1x | 1x | 1x | 1x | 1x |
| 1x | 1x | 2x | 2x | 2x | 1x | 1x | 1x |
| 1x | 1x | 2x | P  | 2x | 1x | 1x | 1x |
| 1x | 1x | 2x | 2x | 2x | 1x | 1x | 1x |
| 1x | 1x | 1x | 1x | 1x | 1x | 1x | 1x |
| 1x | 1x | 1x | 1x | 1x | 1x | 1x | 1x |

FIG. 9B

| | | | | | | | |
|---|---|---|---|---|---|---|---|
| 1x | 1x | 1x | 1x | 1x | 1x | 1x | 1x |
| 1x | 1x | 1x | 1x | 2x | 2x | 2x | 1x |
| 1x | 1x | 1x | 1x | 2x | P | 2x | 1x |
| 1x | 1x | 1x | 1x | 2x | 2x | 2x | 1x |
| 1x | 1x | 1x | 1x | 1x | 1x | 1x | 1x |
| 1x | 1x | 1x | 1x | 1x | 1x | 1x | 1x |
| 1x | 1x | 1x | 1x | 1x | 1x | 1x | 1x |
| 1x | 1x | 1x | 1x | 1x | 1x | 1x | 1x |

MACHINE LEARNED RESOLUTION ENHANCEMENT FOR VIRTUAL GAMING ENVIRONMENT

CROSS-REFERENCE TO RELATED APPLICATIONS

This application claims priority to U.S. Patent Provisional Application No. 62/946,960, filed Dec. 11, 2019, and entitled "MACHINE LEARNED VIRTUAL GAMING ENVIRONMENT," which is hereby incorporated herein by reference.

This application is also related to: U.S. patent application Ser. No. 16/994,482, filed Aug. 14, 2020, and entitled "MACHINE LEARNED GROUND COVERAGE FOR VIRTUAL GAMING ENVIRONMENT" which is hereby incorporated herein by reference; and U.S. patent application Ser. No. 16/994,494, filed Aug. 14, 2020, and entitled "MACHINE LEARNED VIRTUAL GAMING ENVIRONMENT" which is hereby incorporated herein by reference.

BACKGROUND

Today, computer games are popular and played on many different platforms. As computer games become more sophisticated, they demand more computing resources. Hence, there remains a need for improved approaches to operate computer games without overburdening computing resources.

BRIEF DESCRIPTION OF THE DRAWINGS

FIG. 2A illustrates different agents that can be used with the generative machine learning approach shown in FIG. 1A, according to one embodiment.

FIG. 2B illustrates different machine learning agents that can be used with the generative machine learning approach shown in FIG. 1B, according to another embodiment.

FIG. 9A illustrates a representative basemap that has been partitioned into discrete tiles.

FIG. 9B illustrates a representative basemap that pertains to a selectively enhanced resolution basemap.

FIG. 9C illustrates another representative basemap that pertains to a selectively enhanced resolution basemap.

SUMMARY

Figure 1A:
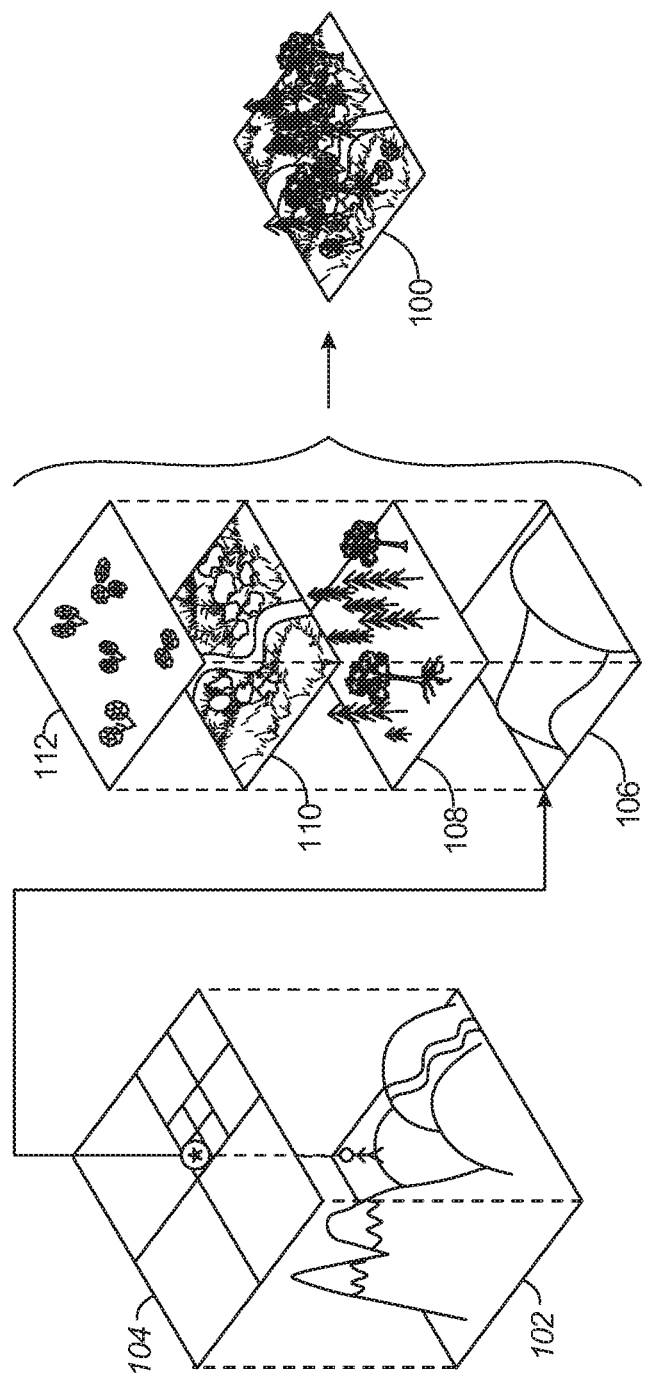
FIG. 1A illustrates a generative machine learning approach to generating a terrain where players move within a virtual world, according to one embodiment.

Embodiments disclosed herein concern improved approaches to providing virtual game worlds for computer games. These approaches make use of machine learning such that the virtual game worlds can be generated at run time. Machine learning agents are trained in advance to the characteristics of the particular game world. Then, these suitably trained machine learning agents can be used to generate a relevant portion of a virtual game world as a player moves through the virtual game world.

In one embodiment, the virtual game world is a graphical environment that can be built from a basemap having a reduced resolution representation. As a player position changes with respect to a basemap, a subset of the basemap that is proximate to the player position can be identified. Then, resolution of the subset of the basemap can be increased using a previously trained machine learning agent to produce an enhanced basemap. The enhanced basemap can then be used to produce at least a portion of the graphical environment for the virtual game world for the computer game.

Through use of the improved approaches, the virtual game world can be provided in high resolution and is able to cover a substantially larger region than conventionally practical. These approaches are also hardware efficient such that the computer games can operate on standard consumer hardware devices.

The invention can be implemented in numerous ways, including as a method, system, device, or apparatus (including graphical user interface and computer readable medium). Several embodiments of the invention are discussed below.

As a method for producing a graphical environment for a computer game played by at least one player, one embodiment can, for example, include at least: retrieving a player position relative to a basemap, the basemap being a reduced resolution representation of the graphical environment; identifying a subset of the basemap that is proximate to the player position relative to the basemap; increasing resolution of the subset of the basemap using a previously trained machine learning agent to produce an enhanced basemap, the enhanced basemap being an enhanced resolution representation of the graphical environment; and rendering the enhanced basemap to produce at least a portion of the graphical environment for the computer game.

As a non-transitory computer readable medium including at least computer program code tangibly stored thereon and executable by an electronic device to produce a graphical environment for a computer game played by at least one player, one embodiment can, for example, include at least: computer program code for retrieving a player position relative to a map, the map being a reduced resolution representation of the graphical environment; computer program code for identifying a subset of the map that is proximate to the player position relative to the map; computer program code for increasing resolution of the subset of the map using a previously trained machine learning agent to produce an enhanced map, the enhanced map being an enhanced resolution representation of the graphical environment; and computer program code for rendering the enhanced map to produce at least a portion of the graphical environment for the computer game.

DETAILED DESCRIPTION

Embodiments disclosed herein concern improved approaches to providing virtual game worlds for computer games. These approaches make use of machine learning such that the virtual game worlds can be generated at run time. Machine learning agents are trained in advance to the characteristics of the particular game world. Then, these suitably trained machine learning agents can be used to generate a relevant portion of a virtual game world as a player moves through the virtual game world.

In one embodiment, the virtual game world is a graphical environment that can be built from a basemap having a reduced resolution representation. As a player position changes with respect to a basemap, a subset of the basemap that is proximate to the player position can be identified. Then, resolution of the subset of the basemap can be increased using a previously trained machine learning agent to produce an enhanced basemap. The enhanced basemap can then be used to produce at least a portion of the graphical environment for the virtual game world for the computer game.

Through use of the improved approaches, the virtual game world can be provided in high resolution and is able to cover a substantially larger region than conventionally practical. These approaches are also hardware efficient such that the computer games can operate on standard consumer hardware devices.

The invention can be implemented in numerous ways, including as a method, system, device, or apparatus (including graphical user interface and computer readable medium). Several embodiments of the invention are discussed below.

In some computer games, one or more players can move through a large, content-rich virtual game world. On consumer hardware used today by players, loading at startup all of the information and structure of the entire game world may not be a realistic option. To avoid this dilemma, a map of the game world can be managed to retain high resolution while not overwhelming the consumer hardware. The management can be repeatedly or dynamically performed so that players can navigate large maps of the game world at high resolution in real-time using personal consumer hardware.

In one embodiment, for a computer game operating in a virtual game world, a new basemap can be generated at each new play session. The generated maps can result from machine learning and can represent a large region at high resolution. For example, maps can be generated for a large area of at least 100×100 km or larger and at a resolution of at least 0.25 meters. Conventionally, such maps for a virtual game world would not be possible because the memory requirements on the game playing electronic device (e.g., personal consumer hardware) would be overwhelmed. As described herein, a large basemap can be generated using on-demand data generation and data streaming. The data streaming can make use of a partitioning scheme. In such an embodiment, a low-resolution version of the large basemap can be generated. Yet, a high-resolution version of the large basemap can be rendered at the region surrounding a player position relative to the large basemap. Advantageously, only a small portion of the large basemap need be rendered at high resolution, thus making the large (e.g., entire) basemap much easier to manage than conventional approaches. In one embodiment, resolution can be enhanced from the low resolution to the high resolution by one or more machine-learning agents. In another embodiment, low to high resolution enhancements may be set at the time the basemap is generated. Although the basemaps being generated using the disclosed techniques are particularly well suited for larger areas, such as at least 10×10 km$^2$ or larger, it should be understood that the disclosed techniques are not limited to any particular size of area or basemap.

Instead of explicitly defining rules that define the appearance of a terrain region of a map for a virtual game world, a machine learning system can determine which terrain features are to be applied based on its learning from a training dataset. Advantageously, maps generated using machine learning can be produced with substantially less human effort and time, and in some cases can be even more visually appealing than conventional procedurally generated counterparts. By different training, machine learning can generate maps having completely different terrain regions (e.g., a desert and a mountain range). The terrain for a map is able to be generated from training data that includes a set of images pertaining to the desired terrain.

As an example, an exemplary virtual game world can take place in a large fictional area of the Black Forest, such as at least 16×16 km$^2$, for example. The terrain for the Black Forest can be generated from scratch using a generative machine learning approach every time the game is launched at a game playing electronic device.

Although the embodiment described herein principally concern a game play environment. it should be understood that other embodiments include a game development environment In such other embodiments, all game content needed not be initially distributed with a game, but can be generated later at a client machine.

FIG. 1A illustrates a generative machine learning approach to generating a terrain where players move within a virtual world, according to one embodiment. The generative machine learning approach is able to generate terrain 100 for a map through a series of machine learning agents. Starting with a basemap 102 generated at game launch with no human contribution. The basemap 102 can then be split using a streaming quadtree partitioning scheme 104, where high-resolution basemap regions 106 are rendered using a resolution enhancement agent. For each high-resolution region, the location and type of trees 108, the ground texture 110 and the location of flowers, rocks and other ground population objects 112 are determined using machine learning, such as a modified version of pix2pix trained on data from Houdini. Houdini is a software suite developed by SideFX.

FIG. 2A illustrates different machine learning agents that can be used with the generative machine learning approach shown in FIG. 1A, according to one embodiment. Using a set of machine learning agents, a basemap is generated and then different layers of information are progressively added to the basemap, ultimately determining the environment where the game takes place. For example, as shown in FIG. 2A, various machine learning agents produced using models, such as StyleGAN, SRGAN and pix2pix. SRGAN refers to for super resolution GAN, and this technique uses a deep neural network to produce higher resolution versions of an image. Pix2pix is an image-to-image translation algorithm based on GANs. However, these exemplary machine learning agents are not required in various other embodiments. The different machine learning agents and their usage and operate are described in detail below.

Figure 3A:
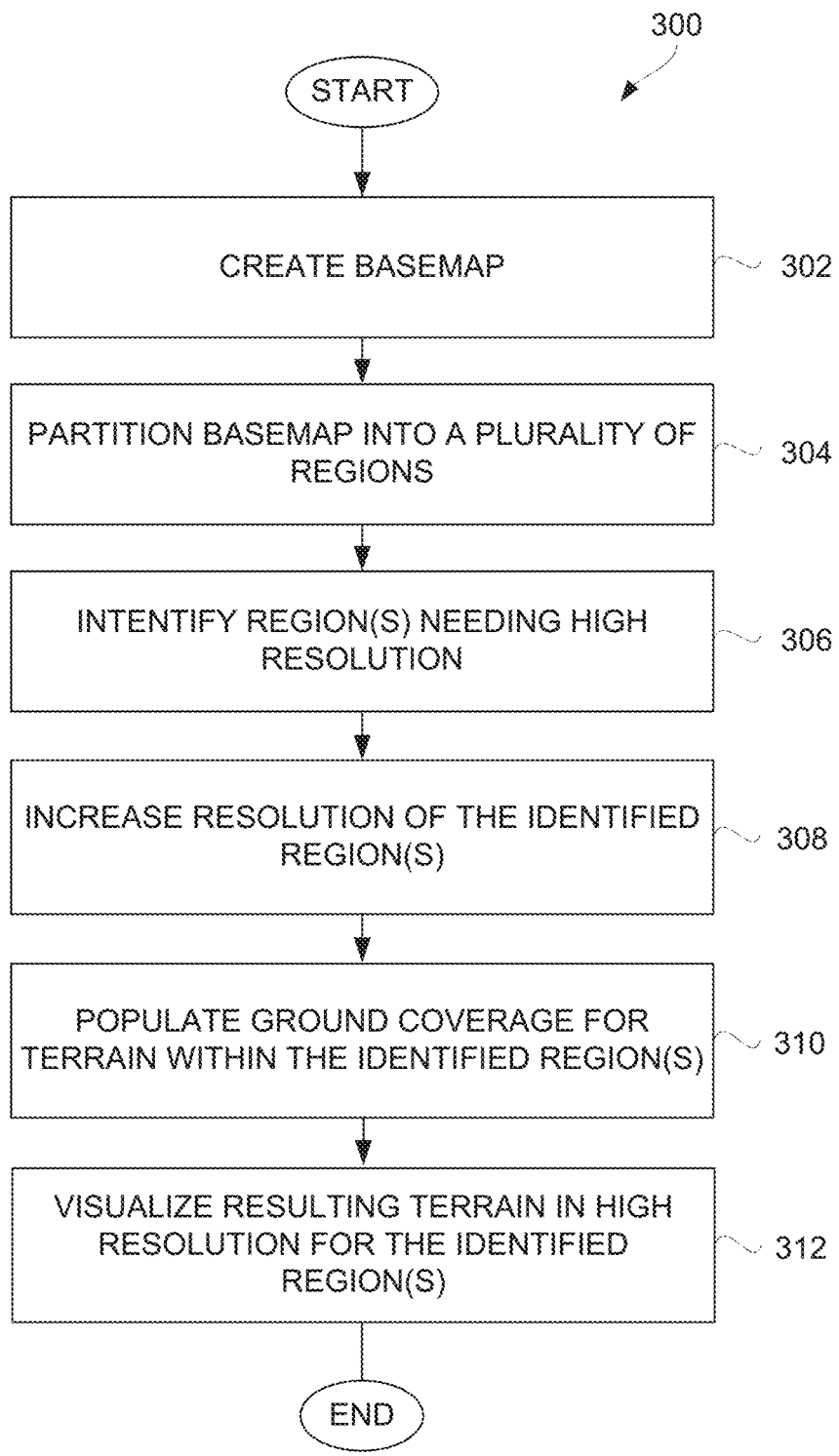
FIG. 3A is a flow diagram of a dynamic graphical presentation process according to one embodiment.

FIG. 3A is a flow diagram of a dynamic graphical presentation process 300 according to one embodiment. The dynamic graphical presentation process 300 can produce a virtual game environment. This virtual game environment can be produced on nominal computing devices, yet yield high resolution and excellent game experience.

The dynamic graphical presentation process 300 can initially create 302 a basemap. Next, the basemap can be partitioned 304 into a plurality of regions. Then, those one or more regions needing high-resolution can be identified 306. As discussed below, this determination can, for example, be based on a player's position within the virtual gaming environment. Thereafter, the resolution of the identified one or more regions can be increased 308. The resolution increase can, for example, use a machine learning agent that has been suitably trained for the relevant environment.

Next, the identified one or more regions can be populated 310 with ground coverage to produce terrain. The terrain is that of the virtual game environment. For example, the terrain can mimic a natural environment (e.g., forest, desert, etc.) and thus can be referred to as natural-like terrain. The appropriate ground coverage depends on the natural environment being mimicked. Here, one or more machine learning agents can be used to populate the ground coverage. Thereafter, the resulting terrain can be visualized 312 in high resolution. Here, the subset of the basemap with populated ground coverage is rendered in high resolution, while remaining portions of the basemap and its ground coverage are rendered, if at all, in one or more lower resolutions. Following the visualization 312 of the resulting terrain, the dynamic graphical presentation process 300 can end. However, typically, the dynamic graphical presentation process 300 will dynamically adapt to a player's position within the computer game. This allows the player's gaming experience to appear in high resolution, while the processing burden on the associated computing device performing the game is manageable, even by nominal computing devices.

Figure 1B:
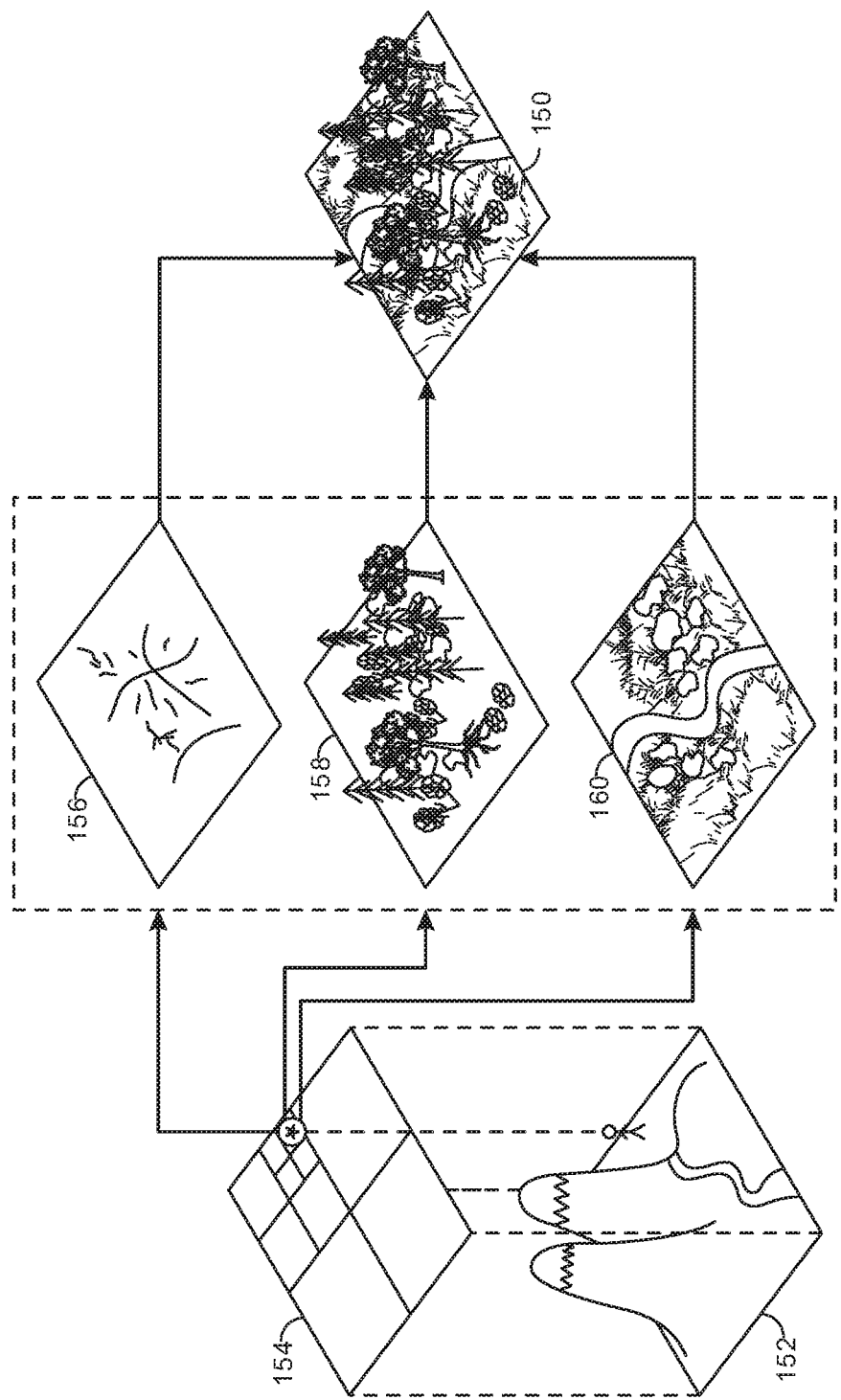
FIG. 1B illustrates a generative machine learning approach to generating a terrain where players move within a virtual world, according to another embodiment.

FIG. 1B illustrates a generative machine learning approach to generating a terrain where players move within a virtual world, according to another embodiment. The generative machine learning approach is able to generate terrain 150 for a map through a series of machine learning agents. Starting with a basemap 152 generated at game launch with no human contribution. The basemap 152 can then be split using a streaming quadtree partitioning scheme 154, where high-resolution basemap regions 156 are rendered using a resolution enhancement agent. For each high-resolution region, the location and type of trees 158, the ground texture 160 and the location of flowers, rocks and other ground population objects 162 are determined using machine learning, such as a population agent trained on data from Houdini as well as a modified version of pix2pix trained on data from Houdini. A ground texture agent can also use machine learning in determining ground texture.

FIG. 2B illustrates different machine learning agents that can be used with the generative machine learning approach shown in FIG. 1B, according to another embodiment. Using a set of machine learning agents, a basemap is generated and then different layers of information are added to the basemap, ultimately determining the environment where the game takes place. For example, as shown in FIG. 2B, various machine learning models can be used in combination, such as ProGAN, SRGAN and pix2pix. ProGAN is a machine learning technique for generating images. The different machine learning agents and their usage and operating are described in detail below. However, these machine learning models or agents therefore are not required in various other embodiments.

Figure 3B:
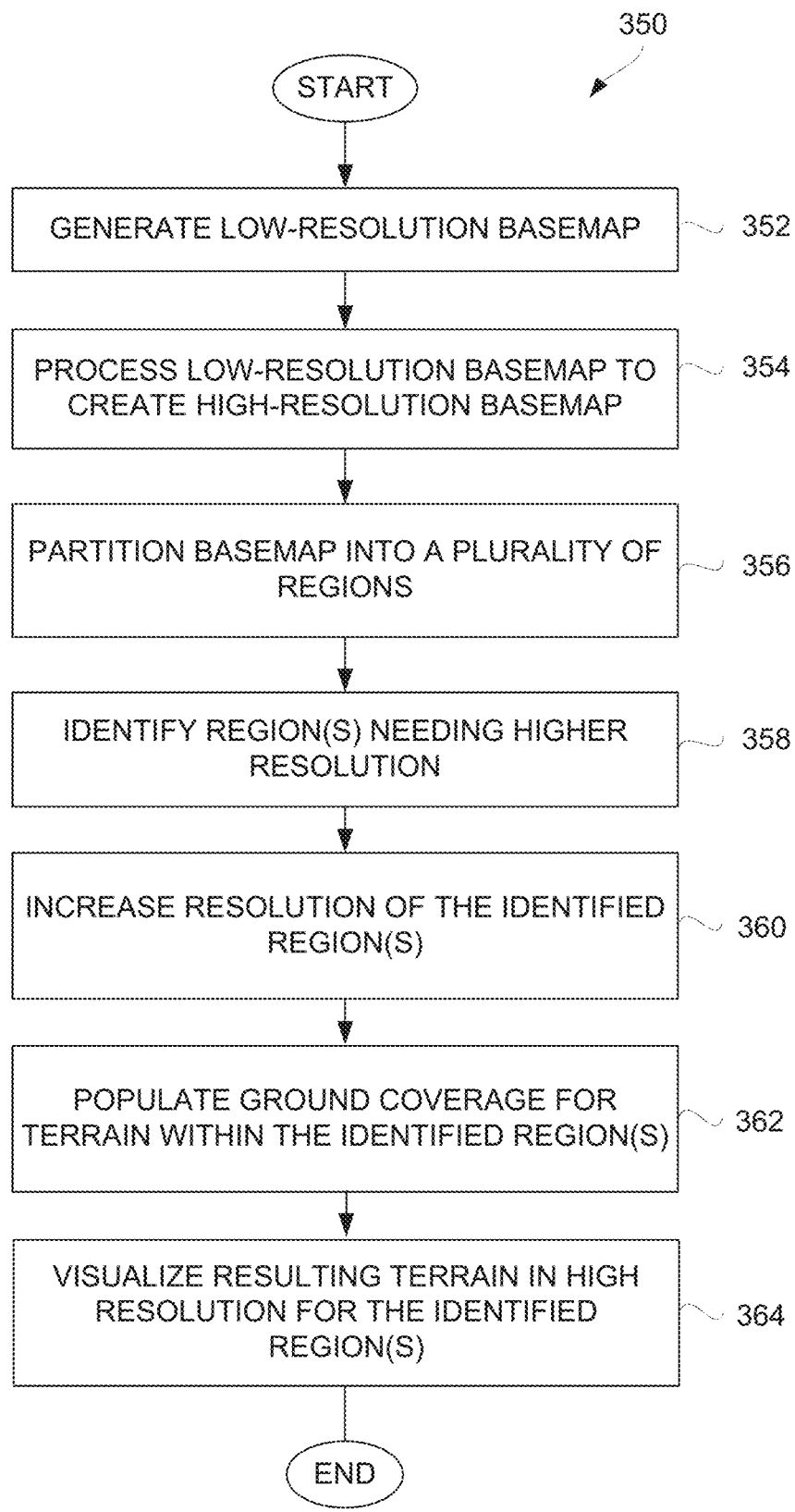
FIG. 3B is a flow diagram of a dynamic graphical presentation process according to another embodiment.

FIG. 3B is a flow diagram of a dynamic graphical presentation process 350 according to another embodiment. The dynamic graphical presentation process 350 can produce a virtual game environment. This virtual game environment can be produced on nominal computing devices, yet yield high resolution and excellent game experience.

The dynamic graphical presentation process 350 can initially generate a low-resolution basemap. Then, the low-resolution basemap can be processed 352 to create a high-resolution basemap. The process 352 to resolution increase can, for example, use a machine learning agent.

Next, the basemap can be partitioned 356 into a plurality of regions. Then, those one or more regions needing higher resolution can be identified 358. As discussed below, this determination can, for example, be based on a player's position within the virtual gaming environment. Thereafter, the resolution of the identified one or more regions can be increased 360. The resolution increase can, for example, use a machine learning agent that has been suitably trained for the relevant environment.

Next, the identified one or more regions can be populated 362 with ground coverage to produce terrain. The terrain is that of the virtual game environment. For example, the terrain can mimic a natural environment (e.g., forest, desert, etc.) and thus can be referred to as natural-like terrain. The appropriate ground coverage depends on the natural environment being mimicked. Here, one or more machine learning agents can be used to populate the ground coverage. Thereafter, the resulting terrain can be visualized 364 in higher resolution. Here, the subset of the basemap with populated ground coverage is rendered in higher resolution, while remaining portions of the basemap and its ground coverage are rendered, if at all, in one or more lower resolutions. Following the visualization 364 of the resulting terrain, the dynamic graphical presentation process 350 can end. However, typically, the dynamic graphical presentation process 350 will dynamically adapt to a player's position within the game world. This allows the player's gaming experience to appear in higher resolution, while the processing burden on the computing device performing the game is manageable, even by nominal computing devices.

Game Genres

Computer games, also referred to as video games, are sophisticated today and require complex computing environments to support the games, particularly with high-resolution graphics and/or multiplayer networked games over the Internet. Additionally, computer games can be implemented on many types of gaming systems or network topologies. These systems or network topologies are the arrangements of elements of a communication and/or computing network used to allow players to play computer games.

Different gaming systems or topologies can be used, including: stand-alone device, local area networked system, wide area networked system, dummy terminal networked system.

Most stand-alone computers with single central processing units (CPUs) are unable to handle large gaming systems or topologies. Many players need to buy more expensive CPUs and/or graphics processing units (GPUs) in order to handle the processing and memory burdens on the player's stand-alone computer to play sophisticated computer games, including rendering graphic-intensive maps. Heavy processing loads on player's stand-alone computer can also lead to overheating. Hence, it is advantageous to reduce burdens place on stand-alone computers used to perform computer games.

In a local-area network system (LAN), multiple computers are all connected on a small network. This is a common system for multi-player games that has one computer acting as a server. However, that one computer needs to have significant graphic processing capability or each individual computer connected to the network needs to be able to render graphic-intensive maps. Unfortunately, rendering takes valuable computing resources and if one computer lags in the processing or rendering of the graphic-intensive maps, it can impede game play on other computers. Moreover, crashing of the gaming system is often because of the lack of computer resources. Thus, it is advantageous to reduce the load on either the server computer and/or all the computers connected to the LAN, make synchronization of all the computers easier, and reduce the lag in the game due to the inefficiencies (i.e., one computer having less computing resources than other computers) of any one computer.

Wide area networked systems (WAN) have multiple computers connected over a wide network. This allows for even more players to play the games than possible in the LAN case. However, similar to the LAN case, synchronization and lag times are important and crashing of the gaming system can occur.

Dummy terminal networks have also been used in gaming systems. Multiple computers with less computing resources than a server may be used to run the gaming system, allowing players to play the games on computers or computing devices with significantly less computing resources, such as a console systems, stand-alone computers, low power browser based computing devices (i.e., Chromebook), mobile devices (including smartphones), and the like. This type of network generally renders graphics (including maps) to all the players and streams the graphics to the player's computing devices. With multiplayer games, the server may need to render different graphics (e.g., portions of a map) to each of the players, which causes issues or problems related to synchronization, lag, and other similar issues.

The invention herein is suitable for use in all types of gaming systems (i.e., topologies) as well as in various game genres. In particular, the invention is useful in gaming systems where significant computing resources are dedicated to either rendering a play environment and/or keeping a rendered play environment in active memory. With regard to game genres, the invention can be applied to any game genre where the user's perspective of the play environment is changing over time.

Today, computer games have many different genres. One popular genre of computer games is a role-playing game (RPG). In RPG games, a human player can assume control of a character or "avatar" that operates in a virtual environment produced by the game. Players can fashion their own online personae and interact with other players' avatars. People work together, through their avatars, to create objects, fight off bad actors, or otherwise achieve objectives in the virtual world. The human player can, for example, move his or her avatar through the virtual environment, interact with virtual objects, or interact with other avatars controlled by other human players and/or game characters.

When playing RPGs, players interact with some type of map or topography. In conventional games developed using the classical approach, these maps are pre-designed and are rendered by the computing device the same way each time the game being played. Additionally, these game systems generally only cover relatively confined areas because the corresponding map consume a lot of resources to design, render and store in memory. Hence, a large map might be implemented through a number of smaller maps because the entire map is too data intensive to be stored in active memory. But, as a player moves from one map to another map, the game must pause while the new segment of the map is rendered and loaded into active memory. Moreover, such games use fixed transition points between segments. This results in a lag, especially if players go back and forth between the different maps, which slows the pace of the game and annoys players.

Advantageously, the invention provides for the generation of unique maps for the game being played. Only certain or specific parts of the map need to be rendered by the computing device at any given time, therefore allowing games to be played on less powerful computing devices. Additionally, this allows for the ability of the less powerful computing device to display larger maps since fewer computing resources are needed to render the map and play the game. Beneficially, only smaller portions of the map need to be rendered in real time, thereby avoiding the need for loading of distinct smaller maps as the player traverses a large geographic area in a virtual game world. Additionally, as the player moves through the virtual game world the map is generated and rendered in real-time without any need to switch between distinct smaller maps as would be conventionally required. This allows for seamless movement and efficient resource utilization so that there is not disruption to game flow when a player traverses between different segments a large geographic area in a virtual game world.

One popular type of role-playing game can have a structured plot. For example, World of Warcraft, is a massively multiplayer online game ("MMOG"). The game developer provides a virtual world and a set of characters for the players to interact with. The player's avatars play the heroes, while the game software directs or referees many of the outcomes.

One common characteristic of many or most RPGs is that the multiple players' avatars share a common game space and can play at the same time. Various players throughout the world connect to a network, log to the game server, and play the game simultaneously. The actions of an avatar controlled by a player can affect the actions of other avatars controlled by other players as well as the status of the game. Such multi-avatar interaction occurs when multiple players play together at the same time, i.e., the game being played is a multiplayer game. However, in other cases, the players need not play at the same time yet the player's avatar's actions can still affect the status of the game and the status of other avatars. Thus, even though the game being played is a single-player game from the perspective of each participant of the game, at a higher level, it is a multiplayer game since the non-player avatars of the other players and the status of the game can be affected.

Games are inherently social, and many players like to play games for the challenge of the game. However, many players also enjoy the social aspect of gaming and the ability to meet up to interact with other players. RPG is a broad family of games where players assume the roles of characters in a fictional setting. For example, a player may assume the role of a character in a fantasy-themed role-playing game and partake in various game interactions such as befriending other characters, battling monsters, completing quests, building and/or trading items, and so on. Actions taken within the game succeed or fail according to a formal system of rules and guidelines. In live action role-playing games (LARPs), players physically perform their characters' actions. In both forms, a director (game master (GM)) usually decides on rules and settings to be used and acts as referee, while other players play the role of one or more characters in the game.

Computer-assisted gaming has been used to add elements of computer gaming to in-person and pen and paper role-playing. In these games, computers are used for record-keeping and sometimes to resolve combat, while the participants generally make decisions concerning character interaction. Several varieties of RPG also exist in primarily electronic media, including multi-player text-based multi-user dungeons (MUDs) and their graphics-based successors, massively multiplayer online role-playing games (MMORPGs). Role-playing games also include single-player offline role-playing video games in which players control a character or team who perform game interactions (e.g., competing in battle, conversing with other players or characters, partaking in quests, trading with merchants, etc.). These games often share settings and rules with pen-and-paper RPGs, but generally emphasize character interaction and/or advancement more than collaborative storytelling.

MMORPGs, such as Blizzard Entertainment's World of Warcraft, Sony Online Entertainment's Ever Quest, or Jagex Games Studio's RuneScape, combine the large-scale social interaction and persistent world of MUDs with graphical interfaces. A persistent world is a virtual world that generally continues to exist even after a user exits the world. User-made changes to its state are, to some extent, permanent. Servers, data structures, algorithms, and other computer assisted technology and software associated with the persistent world generally remain available and operational for the user, or other users from around the world. These are available for the user to join and interact with the persistent world and with other players at any time. Most MMORPGs do not actively promote in-character role-playing; however, players can use the games' communication functions to role-play, which they may do to varying extents. These games often utilize even larger maps than the RPGs and thus have similar issues to RPGs.

More generally, a massively multiplayer online game (also called MMOG or MMO) is a multiplayer video game which is capable of supporting hundreds to hundreds of thousands of players simultaneously, and need not be of the RPG type, but can be applied to any competitive or cooperative endeavor. An MMOG is generally played on a computer network such as the Internet, and features at least one persistent virtual world. In some cases, multiple instances of a persistent virtual world may be maintained for the MMOG. Each instance may be governed by a different set of rules or conventions and may be available to different regions of the world. Some MMOGs are designed as a multiplayer browser game to reduce infrastructure costs and used a thin client. The players can play the game using a computing device. Examples of a computing device use by a player can include personal computing devices (laptop computers, tablet computers, desktop computers), gaming consoles, smartphones or other mobile devices.

Multiplayer games and networked activities, such as MMOGs and MMORPGs, enable players to cooperate and compete on both a small and large scale, and sometimes to interact meaningfully with people around the world. Examples of game-play types include, but are not limited to:

Massively Multiplayer Online First Person Shooter (MMOFPS) is a subset of popular first-person shooter-type games where a player views an environment or virtual world through the eyes of a character. MMOFPS is an online gaming genre which typically features a world (e.g., persistent world) and a large number of simultaneous players in a first-person shooter fashion. These games provide large-scale, sometimes team-based combat.

Massively Multiplayer Online Real-Time Strategy Games (MMORTS) often combine real-time strategy (RTS) with a persistent world though in some cases worlds are "instanced" for the duration of a game, a match, a tournament, or other specified time period. Players may assume the role of a general, king, or other figurehead leading an army into battle while maintaining the resources needed for such warfare. The games are often based in a science fiction or fantasy universe.

Massively Multiplayer Online Sports Games (MMOSG) allow players to compete in more traditional sports, such as soccer, basketball, baseball, hockey, golf or football.

Massively Multiplayer Online Racing (MMOR) is a large, online racing game, although some games may include elements of combat.

Massively multiplayer online rhythm games (MMORGs), or massively multiplayer online dance games (MMODGs), are MMOGs that are also music video games.

Massively multiplayer online management games (MMOMGs) are often considered easy to play and do not take much time. Players log in a few times each week, set orders for an in-game team, and finds how to defeat fellow players.

Massively Multiplayer Online Social Games focus on socialization instead of objective-based game-play. These games can emphasize socializing, world-building, and an in-world virtual economy.

Alternate reality games (ARGs) can be massively-multiplayer, allowing thousands of players worldwide to co-operate in puzzle trails and mystery solving. ARGs may take place in a unique mixture of online and real-world play that usually does not involve a persistent world, and are not necessarily multiplayer.

Games can also be a blended MMO game incorporating features of various game-play types described above or other contemplated game-play types.

Given the large variety of games and the ever increasing need to enhance a player's experience, there is a need to further improve gaming systems or topologies that allow for better synchronization of game play, less lag, less load on the server or player's computing device, less chance of crashing the game system, and the ability to use a computing device (e.g., player's game play electronic device) with much less resources (i.e., standard memory size, standard processor/CPU, standard hard or solid state drive, standard graphics card).

Generative Adversarial Networks

Generative Adversarial networks ("GANs") are machine learning systems consisting of two elements with competing interests: a generator and a discriminator. As an example, a GAN might be designed to produce realistic faces from a portraits database. In this case, the goal of the generator is to generate a portrait as close as possible to those in a training set, and the goal of the discriminator will be to distinguish as well as possible between fake and real images. GANs are designed so that, as the training progresses, both the generator and the discriminator become better at their task, thus making the generated data increasingly realistic. More formally, the generator and discriminator of a GAN are the players of a zero-sum game with the goal of reaching a Nash equilibrium. A zero-sum game is a mathematical representation of a situation in which each participant's gain or loss of utility is exactly balanced by the losses or gains of the utility of the other participants. A Nash equilibrium is a stable state of a system involving the interaction of different participants, in which no participant can gain by a unilateral change of strategy if the strategies of the others remain unchanged. In other words, iI each player has chosen a strategy, and no player can benefit by changing strategies while the other players keep theirs unchanged, then the current set of strategy choices and their corresponding payoffs constitutes a Nash equilibrium.

In the last few years, progressively complicated GANs architectures have been introduced to generate new artworks, resulting in increasingly realistic results. Noteworthy GANs-based architectures include DCGAN, ProGAN and StyleGAN.

StyleGAN is a recent GAN architecture from researchers at NVIDIA Corporation. StyleGAN is an alternative generator architecture for generative adversarial networks, borrowing from style transfer literature. The new architecture leads to an automatically learned, unsupervised separation of high-level attributes (e.g., pose and identity when trained on human faces) and stochastic variation in the generated images (e.g., freckles, hair), and it enables intuitive, scale-specific control of the synthesis. The naming includes style, a term borrowed from neural style transfer, which is an area of computer vision exploring how to transfer the style of an image onto another one. Considering a painting, content denotes its largescale elements and the style indicates the finer details, such as the brush strokes, the color contrast and so on.

Mathematically, given two images $I^1$ and $I_2$, the difference in content between the two is given by the content loss Lcontent, defined as:

$$L_{content}(I_1, I_2) = 1/2 \sum (F_1 - F_2)^2$$

where $F_1$ and $F_2$ are the features map of $I_1$ and $I_2$, respectively.

To quantify the style of an image, the conventional approach is to use a Gram matrix. For an image Ij, its Gram matrix is calculated by multiplying the features map by its transpose, $$G_j = F_j^T F_j$$

with this notation, the difference in style between the two images can be expressed using the style loss Lstyle, defined as $$L_{style}(I_1, I_2) = a \sum_i w_i (G_{1,i} - G_{2,i})^2$$

where i indicates the layer number and Wi the weight assigned, for each convolutional layer, to the corresponding Gram matrix.

The StyleGAN architecture consists of the mapping network f, the synthesis network g and two latent spaces, Z and W, with the latter defined as the intermediate latent space. The mapping network f maps the elements of Z into W, and the synthesis network g maps the elements of W into images, as represented by the following:

$$f: \vec{z}_i \in Z \rightarrow \vec{w}_i \in W$$

$$g: \vec{w}_i \in W \rightarrow I_i \in R^{n \times n}$$

where n×n is the size in pixels of the generated image, Zi and Wi are the i-th latent vectors and Ii is the i-th generated image.

StyleGAN generates images using a progressive architecture, with which the size and resolution of the "image in generation" increases as the training proceeds. In this way progressively finer details are added to the generated images, down to the style-level. For example, when generating a portrait of a person, the fine details can correspond to determining the location of single hairs on the person's head.

With StyleGAN, both the style and the content of the generated image are defined starting from a latent vector. Other style transfer techniques consider instead an image as a source. Using elements of the latent space as a starting point has the advantage that vector operations in the latent space correspond to morphological operations in the generated images: summing the Zi corresponding to a girl with glasses with the Zi relative to an old man we will get a picture closer to an old woman with glasses. It should be noted that the dimensionality m of the latent space is determined by the architecture in use. As a result, in principle, an infinite number of different images can be generated from a latent space. Furthermore, the number of morphological features of an image that can be controlled by controlling the elements of the corresponding latent vector can be increased by increasing m.

ProGAN generates images using a progressive architecture, with which the size and resolution of the "image in generation" increases as the training proceeds. In this way progressively finer details are added to the generated images, down to the style-level.

ProGAN was introduced in 2017 by T. Karras and his colleagues at NVIDIA and Aalto University. See Karras et al., "Progressive Growing of GANS for ImprovedQuality, Stability, and Variation", 2018. See also, Brownlee, "A Gentle Introduction to the Progressive Growing GAN", 2019.

The generator of ProGAN have a progressive architecture, consisting of layers generating images of increasing size. The discriminator of ProGAN checks the images generated by the generator. In this way, both the generator and the discriminator can learn large scale details first, and fine-scale ones later. As the training continues layers are incrementally, increasing the resolution of the generated images.

As input, the ProGAN generator takes a vector z, usually referred to as the latent vector. Latent vectors populate the latent space Z, a manifold which is only locally Euclidean. Intuitively, the generator projects each vector of Z in a distinct image. A remarkable property of the latent space is that by moving along given directions, morphological features in the generated images can be altered. As an example, by modifying the latent vector, one can control how much a person smiles in the image produced by the generator.

To overcome the limitation of dealing with a non-Euclidean manifold, improvements of ProGAN such as StyleGAN have a more complicated structure, consisting of two latent spaces: Z and the intermediate latent space W. See Tero Karras et al., "A style-based generator architecture for generative adversarial networks," Proceedings of the IEEE Conference on Computer Vision and Pattern Recognition, pages 4401-4410, 2019. Incidentally, this allows can yield better feature control and more realistic images.

Basemap Generation

The gaming system provides graphical imagery for a computer-based game. In doing so, the graphical imagery is constructed from various layers, including a base layer. The base layer for the graphical imagery is referred to as a basemap. In one embodiment, the graphical imagery serves as terrain for a game. The terrain is able to be computer generated in real-time for the game, while also being realistic of a naturally existing terrain. In one embodiment, machine learning from satellite images of the natural existing terrain can be used to generate the graphical imagery for the terrain. In another embodiment, machine learning from procedural rules (e.g., defined by an artist) can be used to generate the graphical imagery for the terrain, and by varying the parameters characterizing the terrain multiple versions of a given area can be created. The generation of a basemap is further described below.

To automatically produce a new map for the terrain for a game as needed, a basemap can be formed and relative agents can be trained using a database of images acquired from an image source. The images can be generated using procedural rules or can be acquired from a satellite. With procedural generated images, training images are generated by machine learning agent(s) in view of the procedural rules. Alternatively, with satellite images, the images are actually acquired from satellites and are thus natural and can pertain to any region in the world. In this case, images are generated by machine learning agent(s) that seek to mimic the training images. As an example, training images can be the Appalachia region of the United States, which provides diversity in its structural components, such as reliefs, water bodies, basins, etc. The inventive approach is particularly advantageous for terrains that cover a large area, such as 10×10 km or larger.

Figure 4A:
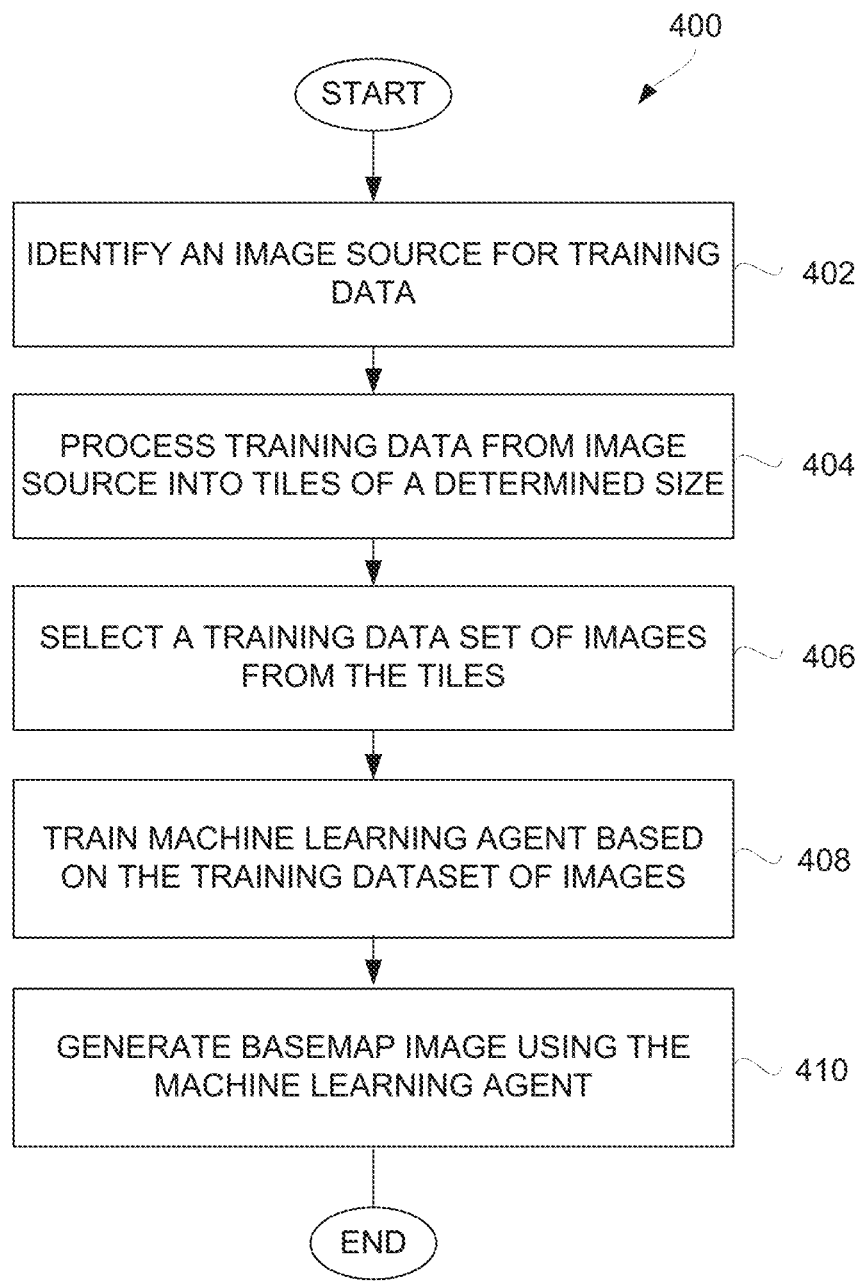
FIG. 4A illustrates a flow diagram of a basemap formation process for training a basemap agent and for creating a basemap according to one embodiment.

FIG. 4A illustrates a flow diagram of a basemap formation process 400 for training a basemap agent and for creating a basemap according to one embodiment. The basemap formation process 400 can identify an image source for training data. The image source for this embodiment can, for example, be satellite acquired images. Once training data is obtained from the identified training source, the training data can be processed 404 into tiles of a determined size. Then, a training dataset of images from the tiles can be selected 406. After the training dataset of images has been selected 406, a machine learning agent can be trained 408 based on the training dataset of images. Finally, a basemap image can be generated 410 using the machine learning agent that has been trained.

Figure 4B:
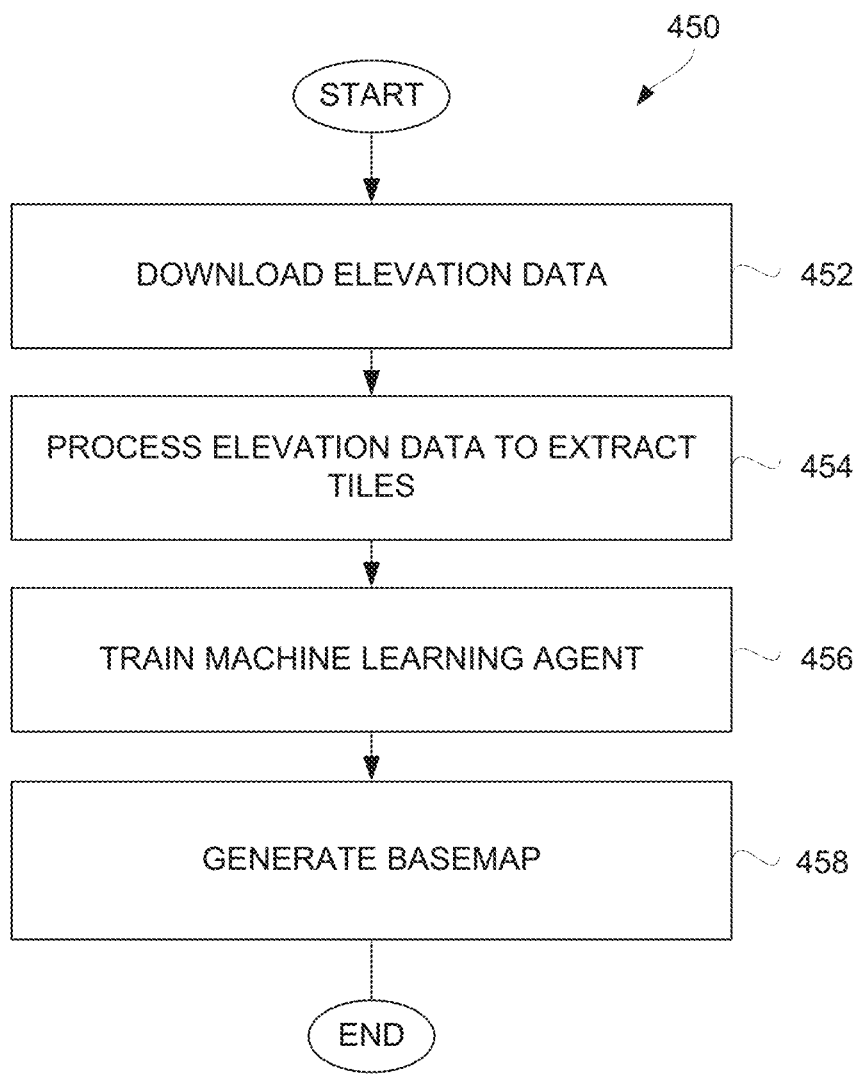
FIG. 4B illustrates a basemap formation process for training a basemap agent and for creating a basemap according to another embodiment.

FIG. 4B illustrates a basemap formation process 450 for training a basemap agent and for creating a basemap according to another embodiment. The basemap formation process 450 can download 452 elevation data, such as elevation data collected by satellites. Depending on a desired resolution for the basemap, different sources for the elevation data can be utilized. The elevation data can then be processed 454 to extract tiles. A machine learning agent can then be trained 456 using the processed elevation data to make objects (e.g., images) similar to those found in the elevation data. In one implementation, the machine learning agent is StyleGAN. After the machine learning agent has been suitably trained 456, a basemap can be generated 458.

An exemplary implementation of the basemap formation process 500 described below includes details on how training data is prepared for StyleGAN, how training can be performed with StyleGAN, how a basemap can then be produced, and further how the resulting basemap can be visualized. For example, the resulting basemap can be visualized using the Unity editor available at unity3d.com.

The basemap to be created normally has a desired resolution. The source of satellite images for training data should have a similar resolution as the desired resolution of the training data. Hence, to generate a basemap with a given resolution, StyleGAN can be trained using a training dataset of images with the same or similar resolution. Each training dataset of images can be prepared from satellite data downloaded from the chosen source of satellite images, such as the sources of differing resolutions listed in the Table 1.

TABLE 1

| Resolution | Covered Regions | Source |
| --- | --- | --- |
| 90 meters | World, 0-60° longitude | Open Topography |
| 30 meters | World, 0-60° longitude | 30-Meter SRTM Elevation Data Downloader |
| 10 meters | | USGS |
| 5 meters | Germany | Bondsman fur Kartographie und Geodasie |
| 5 meters | Alaska | USGS |
| 3 meters | Part of U.S. | USGS |
| 1 meter | Part of U.S. | USGS |

In the embodiment illustrated in FIG. 4B, the downloaded data is elevation data provided in a downloaded image from a satellite. After the elevation data is downloaded 452, the elevation data can be processed 454 to extract tiles of a desired size from the downloaded image. The tile dataset can then be fed into a machine learning agent, such as StyleGAN in one implementation, for training 456. Once trained, the basemap has been generated 458. In one implementation, the basemap can be loaded in Unity. Unity provides a code base that can provide viewing and rendering functionality. Additional information in Unity can be found at www.docs.unity3d.com.

The basemap can be generated by a machine learning agent running, which in this embodiment is StyleGAN. The machine learning agent can be trained using elevation data collected by satellites and publicly available. For example, the elevation data can contain elevation values shown in grey scale (e.g., black=maximum depth, white=maximum height). The elevation data from satellites can be from any region in the world. For example, the regions could be mountainous (e.g., Appalachia, Alps), arid (e.g., Sahara Desert) or coastal (e.g., San Diego), as a few examples. It should be noted that elevation data from satellites is more accurate with respect to regions near the Equator, such as below 60° longitude, otherwise there are projection-related issues that can distort the elevation data.

The extraction of tiles from the elevation data can be performed using a 2D sampling approach, such that a given number of tiles with the desired size are extracted from a satellite image containing elevation values.

Using StyleGAN's default settings, the generator for 256×256 pixels images has 23 million parameters. As such, realistic 256×256 pixels basemaps can be generated using 1000 training images. For larger basemaps, it is advantageous to use a larger dataset for training. For example, a 1024×1024 pixels resolution might be trained using 5000 or more images.

Depending on the size of the basemap to be generated, StyleGAN can be trained using elevation data downloaded from different sources (see Table 1). In one implementation, the basemap can be a 30×30 km made of 256×256 pixels, which corresponds to a resolution of 120 m per pixel. To get training data with the same resolution, elevation data can be downloaded with 30-meter resolution from dwtkns.com, as an example. The downloaded elevation data can be binned at 4×4 to prepare the training database, which consists of images with a resolution of 120 m.

When processing the downloaded elevation data images with the GIS data, a significant number of images (e.g., 1000) can be extracted from the GIS data source (e.g., one or more satellite images), thus building a training set.

In one implementation, StyleGAN can be trained using a database of one thousand 256×256 pixels images stored in the 24-bit png format, as the training set. Each image used for the training is a matrix with size 256×256×3, or 256×256 with three channels. StyleGAN, as originally developed, concerned photos and three channels, the first channel stored intensity values for the red color, the second channel stored intensity values for green and the third channel stored intensity values for blue, following the RGB acronym. In this implementation, the data type is an image providing elevation data, so different information can be stored the channels. For example, in training StyleGAN, a set of images in the png format can store elevation data in the first channel, and zeros can be stored in the other two channels since they are not needed.

In training the StyleGAN agent, the number of training iterations can vary. However, the training appears to settle after 10 M iterations. For example, training for 25 M iterations is more than sufficient for most cases. Once the StyleGAN agent is trained, it can be used to generate basemap images. In one implementation, the basemap images can be 3-channel RGB pngs with 8-bit channels. As a result, the values that can be stored in each pixel are limited to the range {O, 255}. In this implementation, the training data has its data only in the first channel.

Each value stored in a 24-bit png must be an integer between 0 and 255. On the other hand, elevation values collected by satellites range from the thousands of meters of mountain tops to the negative thousand meters of the oceanic depths. To store elevation data in a channel of a png image, the tiles extracted from the downloaded GIS data can be resealed so that for each tile the elevation ranges from 0 to 255. In one embodiment, the elevation values Eoriginal recorded by a satellite stored in a png can be resealed as follows:

$$ERescaled = round[(255 \times 1/(M-m) \times Eoriginal], m ? \cdot O$$

where ERescaled is the resealed elevation value, and m and Mare the minimum positive and the maximum elevation value in the image, respectively. "Round" indicates the operation of approximating to the closest integer value.

To represent the elevation values in millimeters instead of using absolute values, the elevation values can be resealed and can be stored in a different file format. For example, the resealed elevation values can be stored in raster format with 32-bit available per entry.

Once a training dataset is prepared, StyleGAN can be trained using the training dataset. For such training, from recommendations from the official page on GitHub, the steps that can, for example, be followed are: (1) store the training data as TFRecords, and (2) launch the training script. See, e.g., Karras et al., "StyleGAN—Official Tensor-Flow Implementation"; see also "TFRecords and tf.Example".

Instead of making a map manually, generative neural networks are used. In this way, instead of needing to explicitly define numerous rules, artificial intelligence can be used to learn terrain features from a training dataset of images. In the above embodiment, we used satellite images for training of the artificial intelligence. However, in one embodiment, procedural rules defined by a technical artist are used for training of the artificial intelligence. Here, basemaps are able to be procedurally generated by machine learning argents that follow a set of rules defined by a technical artist (e.g., using Houdini). Using such a procedural approach, by varying parameters that characterize the terrain, multiple versions of a given area can be generated as basemaps. The map generation herein takes into account the location where the video game takes place. For example, to get a Black Forest-like look, operations or parameters can be adjusted to mimic the natural terrain, such as the impact of geological erosion caused by water flow and by thermal weathering. Although satellite images are not used for training images in this embodiment, satellite images of the corresponding natural terrain to be mimicked can still be used as references, to evaluate the ability of the machine learning agents to produce natural-like basemaps.

Generating a basemap using a machine learning agent can provide the following advantages: (i) every time the game starts, a new basemap can be generated on the user's machine; and (ii) features of the generated map can be controlled by controlling the vector provided as input to ProGAN; and (iii) the approach used is able to generate various different terrains (e.g., a desert or a mountain range). For example, to set the game in a new region, the basemap agent would need to be retained with an appropriate set of training images.

Figure 5A:
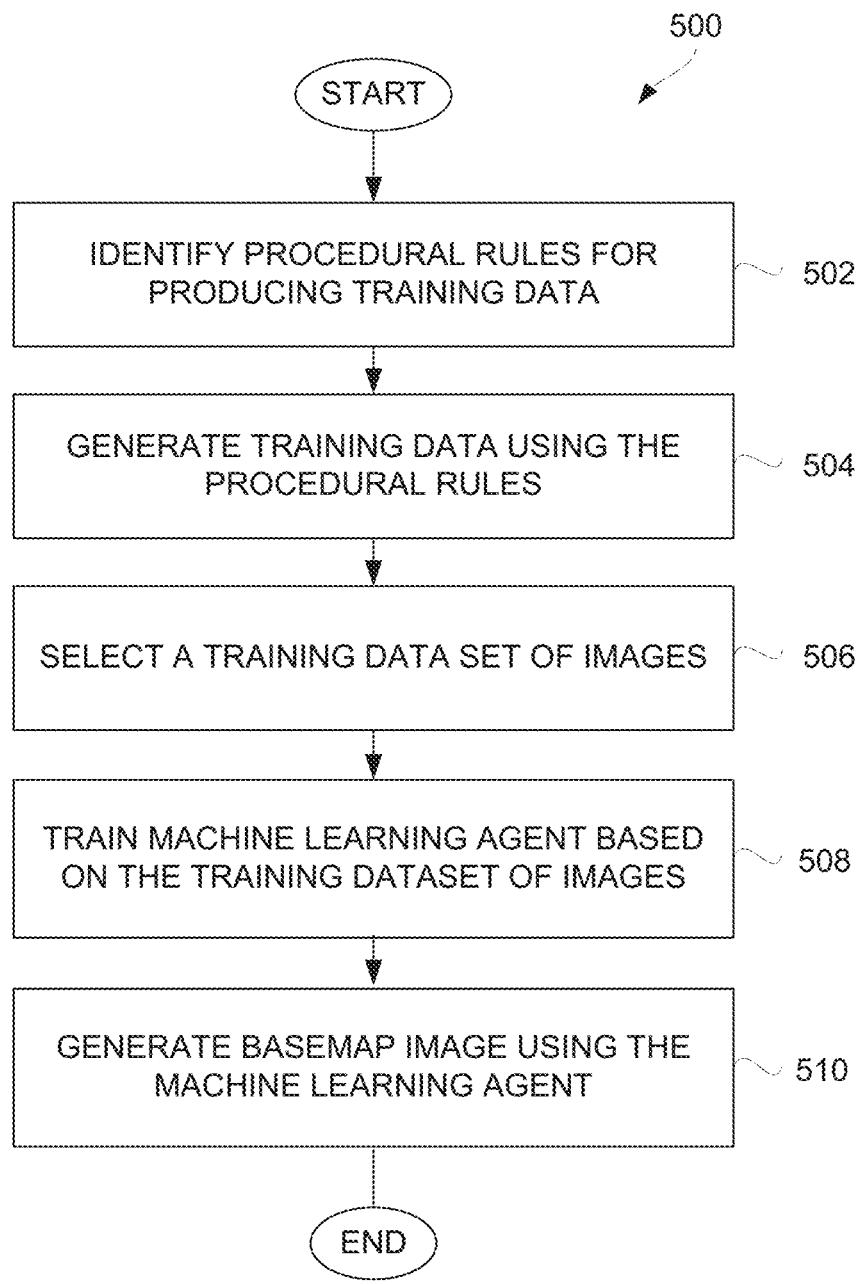
FIG. 5A illustrates a flow diagram of a basemap formation process for training a basemap agent and for creating a basemap according to another embodiment.

FIG. 5A illustrates a flow diagram of a basemap formation process 500 for training a basemap agent and for creating a basemap according to another embodiment. The basemap formation process 500 can identify 502 procedural rules for producing training data. Next, generate 504 training data using the procedural rules. The training data includes at least a plurality of images. Then, a training dataset of images can be selected 506. After the training dataset of images has been selected 506, a machine learning agent can be trained 508 based on the training dataset of images. Finally, a basemap image can be generated 510 using the machine learning agent that has been trained.

Figure 5B:
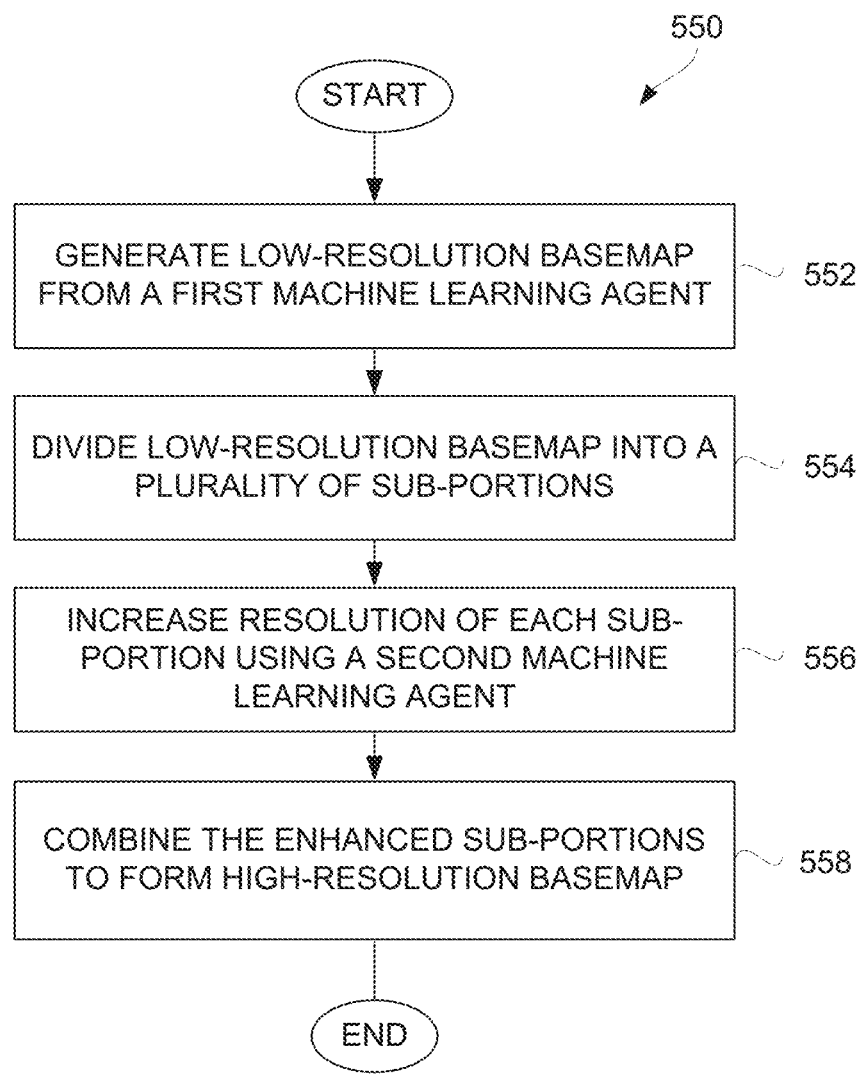
FIG. 5B illustrates a basemap formation process for training a basemap agent and for creating a basemap according to another embodiment.

FIG. 5B illustrates a basemap formation process 550 for training a basemap agent and for creating a basemap according to another embodiment. The basemap formation process 550 can generate 552 a low-resolution basemap from a first machine learning agent. Next, the low-resolution basemap is divided 554 into a plurality of sub-portions. The resolution of each sub-portion can be increased 556 using a second machine learning agent. Thereafter, the enhanced sub-portions can be combined 558 to form a high-resolution basemap.

In one embodiment, basemaps can be generated by running two machine learning agents. For example, a basemap agent can generate a 64×64 pixels basemap modeled after the Black Forest morphology, and an upres-basemap agent can increase the basemap size from 64×64 to 512×512 pixels. Elevation values can be represented in colorscale. The map can, for example, have a size of 16×16 km$^2$ and a resolution of 32 m/pixel. The training dataset can be procedurally generated in Houdini based on the features of the Black Forest in Germany.

In one embodiment, to prepare a dataset to be used for training the basemap agent and the upres-basemap agent there are two basic steps: generating the training data and pre-processing the training data. The first step pertains to procedurally generating a large number of basemaps (e.g., 4000), modeled after a desired terrain for the virtual game world. Houdini can be used to generate the basemaps. In one implementation, the basemaps can be stored as .npz' files with a size of 512×512 pixels each. Each .npz' file can contain multiple Numpy files (.npy), which allow data with 64-bit precision to be stored. In this way, one is able to directly store elevation data with sub-mm resolution. Once loaded into Python, each basemap file can be pre-processed to make the training more effective. For example, the training dataset can be augmented by appending to the tensor relative to each map its horizontal and vertical gradient, calculate using the Sobel operator. Then, the Sobel operator can be used to emphasize slopes in the training basemaps, thus helping agents to learn the morphology of the desired terrain. See Zhonghang Qiu et al., "Void filling of digital elevation models with a terrain texture learning model based on generative adversarial networks," Remote Sensing, 11(23): 2829, 2019.

In this embodiment, there are two machine learning agents used to generate a basemap. A basemap agent generates a low-resolution basemap (e.g., 64×64 pixels). A upres-basemap agent can be used to increase the size of the basemap to a high-resolution basemap (e.g., 512×512). The upres-basemap agent does not only increase the size of the basemap, but also adds fine-level details. Both agents are trained online and executed when the game starts.

In one embodiment, the basemap agent operates to generate a new basemap as a 64×64 pixels map. In one embodiment, this basemap agent can be trained using ProGAN. In one implementation thereof, a PyTorch reimplementation of ProGAN can be used. See Animesh Karnewar, "ProGAN reimplementation in PyTorch," 2019, for additional information on re-implementation in PyTorch. To estimate which training parameters give satisfying results, the trend of the loss function, for both the generator and the discriminator, and the perceptual quality of the generated images can both be considered.

The basemap agent can be trained for a different number of epochs at different resolutions, as shown in Table 2 below.

TABLE 2

| Resolution (pixels) | Number of epochs |
| --- | --- |
| 4 × 4 | 300 |
| 8 × 8 | 400 |
| 16 × 16 | 500 |
| 32 × 32 | 2000 |
| 64 × 64 | 2000 |

The generated images can initially be 4×4 pixels, and then have their size/resolution increased by a factor of two several times. As shown in Table 2, the number of epochs increases with the resolution. In general, the training time is increased as the size of the generated images increases—the more details there are, the longer the generator needs to learn them.

To more efficiently train the basemap and the upres-basemap agent, the training dataset can be augmented using the Sobel operator. For example, using horizontal and vertical gradients, the training dataset can be augmented to emphasize slopes in the training basemaps.

After the "low-resolution" (e.g., 64×64 pixels) basemap has been generated by the basemap agent, its resolution can be increased. In one implementation, the low-resolution basemap can be split into 32×32 pixels regions, and then each region can have its resolution increased to 256×256 pixels by the upres-basemap agent. In this way, the resolution of the entire basemap is increased from 64×64 pixels up to 512×512 pixels. In one implementation, by using a U-net structure, the upres-basemap agent only needs to be applied once to increase the resolution of the basemap by eight times. Furthermore, realistic details are added during the increasing of its resolution by the upres-basemap agent. As an example, the upres-basemap agent can be trained using the following parameters: a batch size of 32 images, 300 iterations, and a learning rate of 0.0001. For additional information on a U-net structure, see Olaf Ronneberger et al., "U-net: Convolutional networks for biomedical image segmentation," International Conference on Medical image computing and computer-assisted intervention, pages 234-241, Spring 2015.

Once a video game is started, a 512×512 pixels basemap can be generated. In one embodiment, the basemap can be generated in accordance with the following procedure:

First, generate a 64×64 pixels basemap using the basemap agent.

Second, divide the basemap into multiple portions (e.g., nine portions).

Third, using the upres-basemap agent, increase the resolution of each of the multiple parts of the low-resolution basemap. For example, the upres-basemap agent can increase the resolution by a factor of eight, so each 32×32 pixels portion is increased in resolution to 256×256 pixels.

Fourth, deemphasize border data of each the parts of the low-resolution basemap that have been resolution enhanced. For example, each resolution enhanced part can be multiplied by a 2D Gaussian (e.g., size: 256×256 pixels, standard deviation: 64 pixels). In this way, each resolution enhanced part of the basemap can be altered to emphasize information at its center region and progressively de-emphasize information going outward from the center region to its borders. This allows to eliminate artifacts at borders when stitching together the resolution enhanced parts to form the high-resolution basemap.

Fifth, combine the resolution enhanced parts into a high-resolution basemap, such as a 512×512 pixels basemap. This can also be referred to as stitching the parts together to form the high-resolution basemap. The parts of the high-resolution basemap are recombined as follows: (a) recombine the resolution enhanced parts following border deemphasizing (i.e., 256×256 pixel portions multiplied by 2D Gaussians) onto another high-resolution pixel matrix (e.g., a 512×512 pixels matrix); (b) recombine a single 512×512 pixels matrix the different 2D Gaussians, each with 256×256 pixels; and; (c) divide the recombined resolution enhanced portions after border deemphasizing by the recombined 2D Gaussians. For each resulting pixel, its value is the weighted average of the signal from all portions containing it.

Figure 5C:
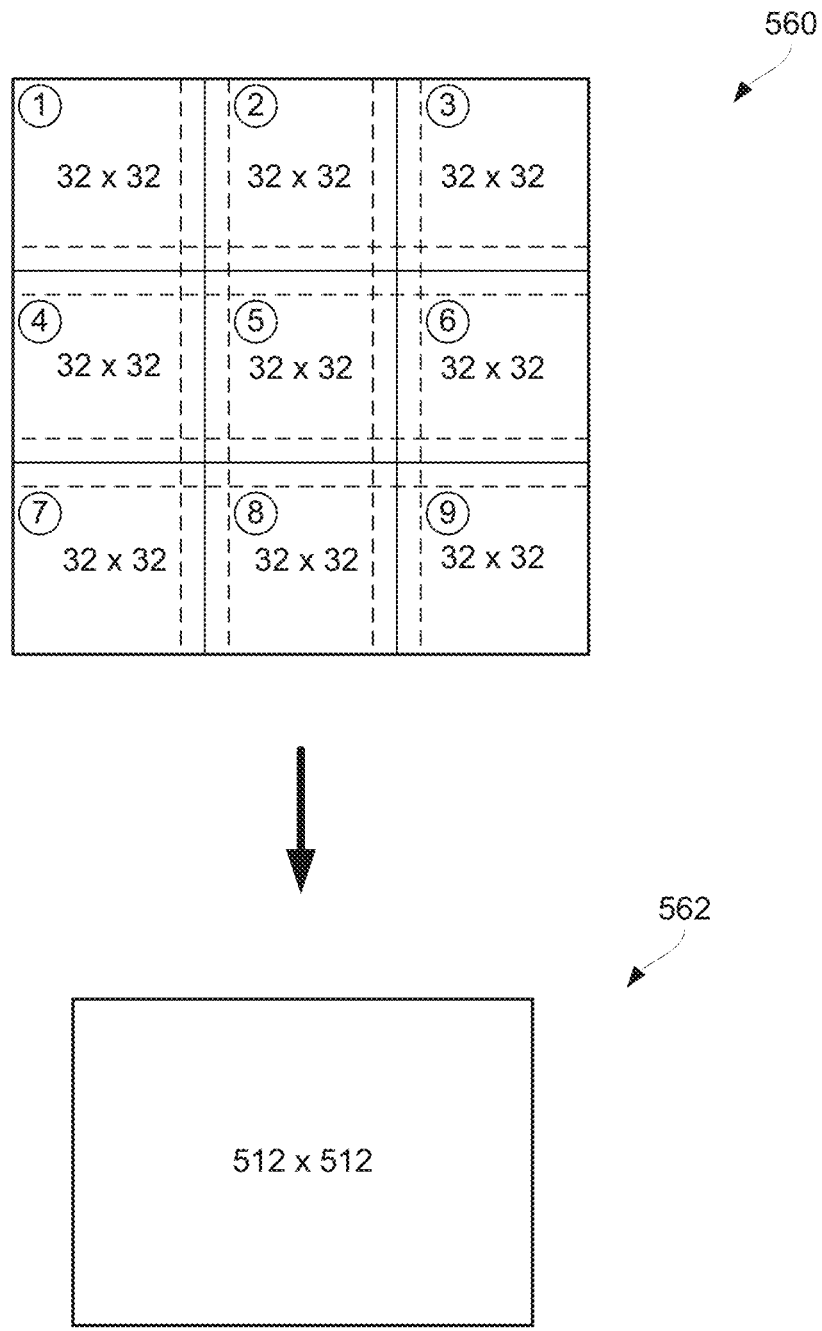
FIG. 5C illustrates a representation of basemap division and resolution enhancement according to one embodiment.

FIG. 5C illustrates a representation of basemap division and resolution enhancement according to one embodiment. An initial basemap 560, which is a low-resolution basemap, is depicted as being divided into multiple parts (e.g., as depicted nine (9) parts), which overlap at adjacent boundaries. The degree or depth of overlap can vary, but as an example the overlap can be 16. The resulting basemap 562, which is a high-resolution basemap, is the basemap used in subsequent processing.

For example, using a basemap agent, a low-resolution basemap can first be produced, such as a 64×64 pixels basemap. That low-resolution basemap can then been divided into nine partially overlapping parts, each with a size of 32×32 pixels. Then, using the upres-basemap agent, the 32×32 pixels regions are converted into 256×256 pixels images. Finally, the resulting 256×256 pixels images are then combined into the final map, with a size of 512×512 pixels.

Resolution Enhancement

The map of a virtual game world can be constructed from a basemap and a resolution enhancement agent. A basemap can be partitioned into regions, such that each region of the basemap can be provided in a different resolution, if desired. The resolution enhancement agent can be used to selectively increase resolution of those regions of the basemap that are more relevant to current game play, such as where a player is located within the map of the game world. These techniques are particularly useful for games having a large map area where game play can occur (i.e., virtual game world).

In one embodiment, the partitioning of a basemap can be performed using a partitioning algorithm, such as a streaming quadtree partitioning scheme. Using the streaming quadtree partitioning scheme, different regions of a basemap can be rendered at different resolutions. By partitioning, it is possible to render maps of arbitrary size at high resolution while keeping the computational resources (e.g., processor and memory usage) required to a manageable level for typical gaming devices performing the game. The gaming device can, for example, be a player's game play electronic device or some type of personal computing device. Background information on a quadtree partitioning scheme can be found in documentation of a Proland library, developed by scientists working at INRIA in Grenoble, France, see Proland homepage.

Figure 6:
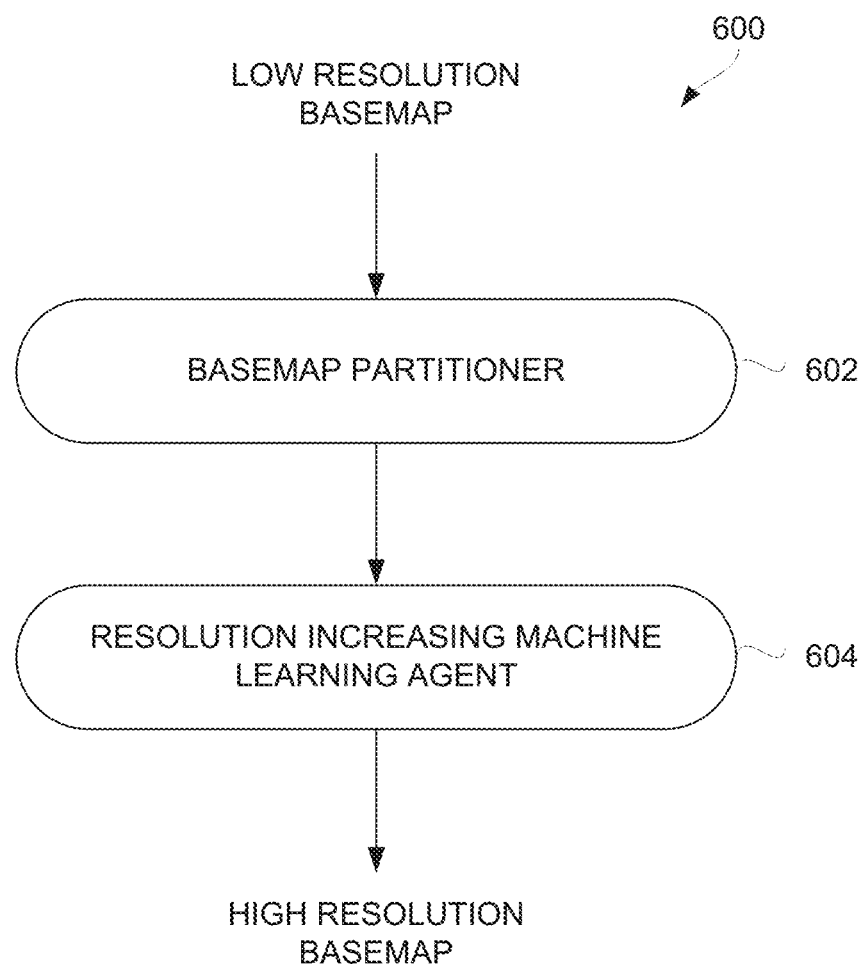
FIG. 6 illustrates a flow diagram of a resolution enhancement process according to one embodiment.

FIG. 6 illustrates a flow diagram of a resolution enhancement process 600 according to one embodiment. The resolution enhancement process 600 can be performed by a gaming device. In one embodiment, the gaming device can be a personal computing device (e.g., personal computer) with typical hardware components. For example, the personal computing device can be a smartphone, desktop computer, tablet computer or notebook computer. In another embodiment, the resolution enhancement process 600 can be performed on a network-connected server computer.

The resolution enhancement process 600 can receive a low-resolution basemap. For example, the received low-resolution basemap might have a resolution in the tens of meters scale. The low-resolution basemap can be supplied to a basemap partitioner 602. The basemap partitioner 602 can operate on the incoming low-resolution basemap to partition the low-resolution basemap into a plurality of distinct regions. In one implementation, the distinct regions can include one or more tiles which are normally of uniform size.

The partitioned low-resolution basemap can then be provided to a resolution increasing machine learning agent 604. The resolution increasing machine learning agent can individually operate on one or more of the distinct regions of the low-resolution basemap to increase the resolution of the corresponding region for the basemap. The resolution increasing machine learning agent 604 can operate to increase the resolution of some or all of the distinct regions. Typically, however, the resolution increasing machine learning agent 604 is selectively applied to increase the resolution only of certain of the regions. By selectively increasing resolution of just those regions that are more important, the processing burden on the gaming device can be managed. The result produced by the resolution increasing machine learning agent 604 is a high (or higher) resolution basemap region. For example, the high resolution basemap can have a resolution up to 0.25 meters. In one implementation, the resolution increase is in the x-y plane, with no change to the z plane resolution. As noted, the resolution of the basemap is higher in only those regions that have had their resolution increased by the resolution increasing machine learning agent 604.

Figure 7:
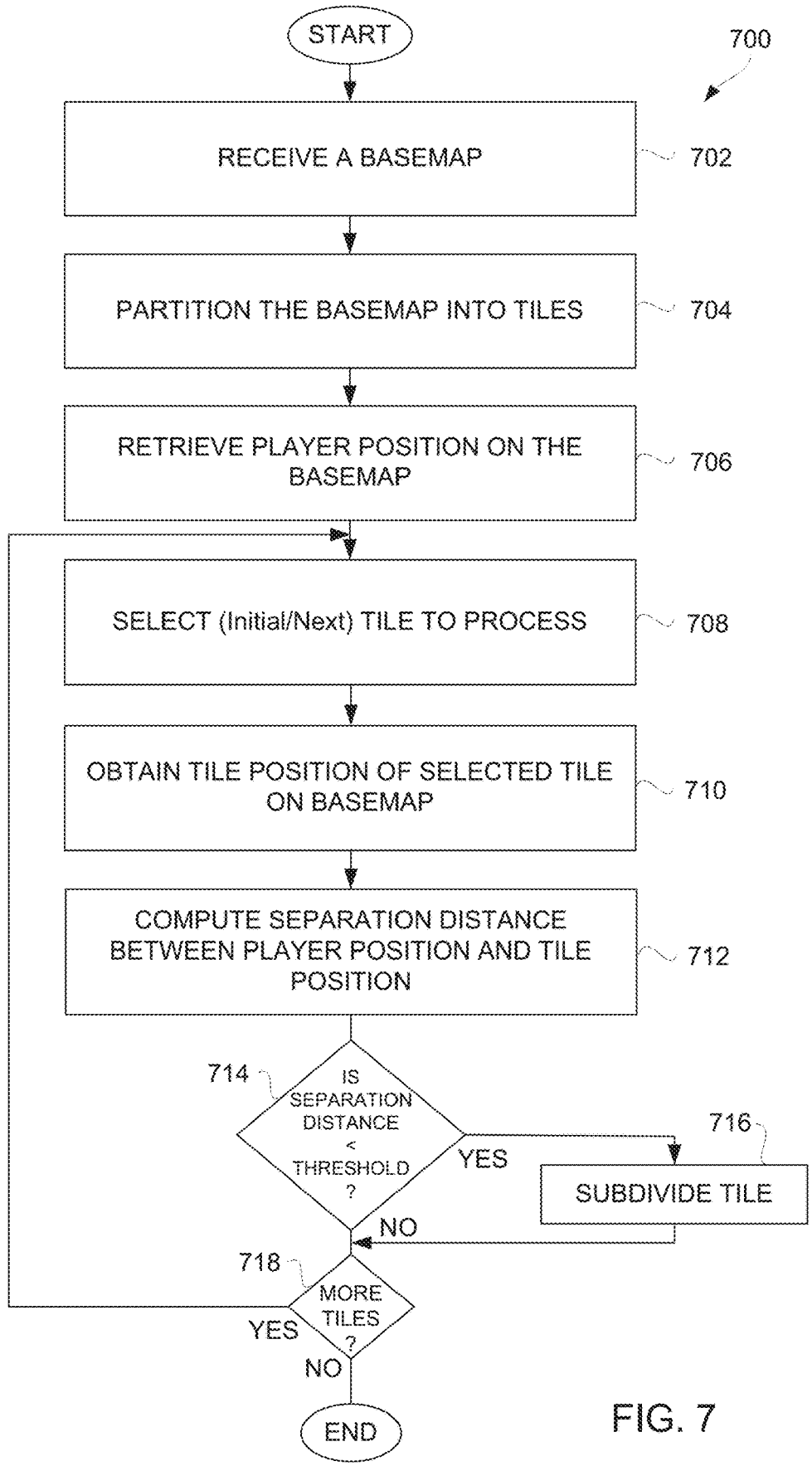
FIG. 7 is a flow diagram of a basemap partition process according to one embodiment.

FIG. 7 is a flow diagram of a basemap partition process 700 according to one embodiment. The basemap partition process 700 operates to perform a partitioning process on a basemap. The partitioning of the basemap into the plurality of tiles can, for example, be performed by the basemap partitioner 602 of the resolution enhancement process 600 shown in FIG. 6.

The basemap partition process 700 can begin by receiving 702 a basemap to be processed. The basemap can then be partitioned 704 into a plurality of tiles. At this point, the entire basemap has been initially partitioned uniformly into tiles of a low or base resolution.

Next, the basemap partition process 700 can further process each of the tiles to determine which of those tiles are to be further subdivided to provide greater resolution at that tile of the basemap. In this regard, a player position on the basemap being processed can be retrieved 706. Next, a tile within the basemap can be selected 708 for processing. The tile position of the selected tile on the basemap can be obtained 710. Then, a separation distance between the player position and the tile position can be computed 712. A decision 714 can then determine whether the separation distance is less than a threshold amount. When the decision 714 determines that the separation distance is less than a threshold amount, the tile being processed can be subdivided 716. The subdivision 716 of the tile produces multiple sub-tiles that take the place of the tile being processed. The subdivision of the tile forms a plurality of sub-tiles and the effect is to increase the resolution by a factor of the number of sub-tiles being produced by the tile being subdivided 716.

For example, if the tile being processed is subdivided into four (4) sub-tiles, then the resolution of each of the individual sub-tiles would by two times (2×) resolution of the tile being processed.

On the other hand, when the decision 714 determines that the separation distance is not less than the threshold, the tile being processed does not need to be further subdivided. Hence, following the decision 714 when the separation distance is not less than the threshold (as well as following the block 712), a decision 718 can determine whether there are more tiles associated with the basemap to be processed. When the decision 718 determines that there are more tiles to be processed, the basemap partition process 700 can repeat the block 708 and subsequent blocks to process a next selected tile. Finally, when the decision 718 determines that there are no more tiles of the basemap to be processed, the basemap partition process 700 can end.

The subdivision of a basemap into tiles and their subsequent selective increase in resolution can be controlled to vary depending on how close the given tile is to the player position in a virtual game world. This provides a way to provide high resolution gaming world to players, while not overly taxing the computing resources of the player's gaming device. This approach is particularly advantageous with gaming worlds that correlate to large gaming areas that are potentially graphically rendered during game play.

In another embodiment, during game play, the player has a vision region in the game that corresponds to the player position. In such case, the subset area of the basemap is dependent on the vision region. The vision region can pertain to what a player's character can see during game play. The vision region can also be impacted to environmental conditions at that region in the game. For example, rain, fog, cloud coverage, fullness of moon, etc. can impact the extent of vision available to the player's character. In any event, the vision region can be used as an alternative, or in addition to, the player position.

Figure 8:
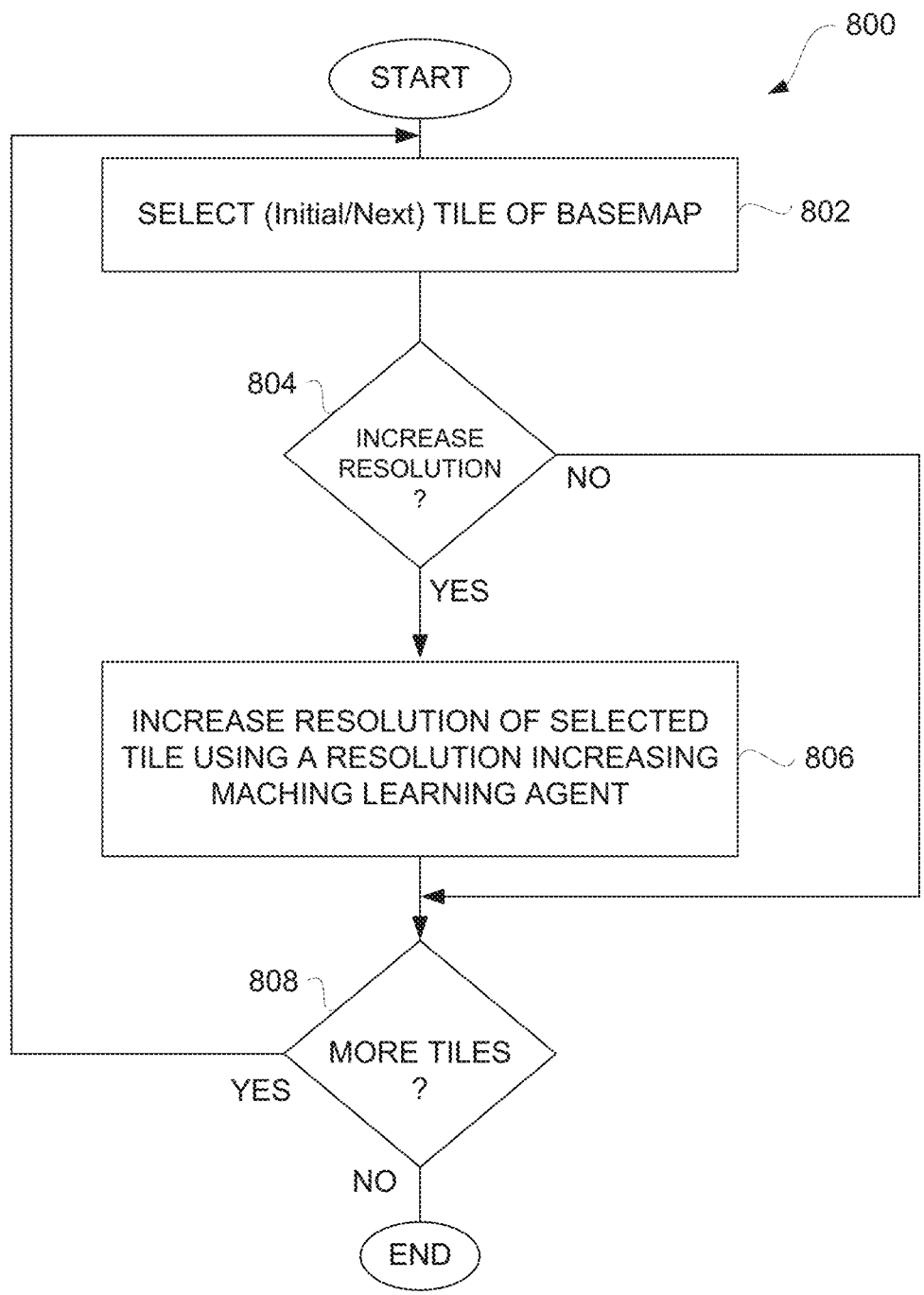
FIG. 8 is a flow diagram of a tile resolution enhancement process according to one embodiment.

FIG. 8 is a flow diagram of a tile resolution enhancement process 800 according to one embodiment. The tile resolution enhancement process 800 can operate by a gaming device (e.g., personal computing device) to increase the resolution of a given tile. Typically, the tile resolution enhancement process would be performed after the partitioning or subdivision of the regions of a basemap to form tiles. The tile resolution enhancement process 800 can, for example, be performed by the resolution increasing machine learning agent 604 of the resolution enhancement process 600 shown in FIG. 6.

The tile resolution enhancement process 800 can initially select 802 an initial tile of the basemap to be processed. Then, a decision 804 can determine whether to increase the resolution of the selected tile. When the decision 804 determines that the resolution of the selected tile should be increased, the resolution of the selected tile can be increased 806 using a resolution increasing machine learning agent. Alternatively, when the decision 804 determines that the resolution of the selected tile should not be increased, the block 806 can be bypassed. Thereafter, following the block 806 when resolution has been increased or following the decision 804 when resolution is not to be increased, a decision 808 can determines whether there are more tiles to be processed. When the decision 808 determines that there are more tiles to be processed, the tile resolution enhancement process 800 can return to repeat the block 802 and subsequent blocks so that a next tile can be selected 802 from the basemap and similarly processed. On the other hand, when the decision 808 determines that there are no more tiles to be processed, the tile resolution enhancement process 800 can end.

In one embodiment, an area of a map centered on a player of a computer-implemented game can be rendered at higher resolution, and regions surrounding that area can be rendered at increasingly lower resolution. The high-resolution region moves as the player moves, iteratively and dynamically.

FIG. 9A illustrates a representative basemap 900 that has been partitioned into discrete tiles. The tiles as shown in FIG. 9A all have a low resolution denoted as 1×.

FIG. 9B illustrates a representative basemap 920 that pertains to a selectively enhanced resolution basemap. The representative basemap 920 illustrates a player position (P) with respect to the representative basemap 920. The representative basemap 920 indicates that most of the tiles still have a low resolution (1×), but a subset of the tiles have an increased resolution denoted as 2×. In this particular exemplary embodiment, the tiles having an increased resolution are proximate to, or in this example adjacent (e.g., surrounding), the player position (P).

FIG. 9C illustrates a representative basemap 940 that also pertains to a selectively enhanced resolution basemap. The representative basemap 940 is similar to the representative basemap 920 in that a subset of the tiles proximate (e.g., adjacent) to the player position (P) have an enhanced resolution. However, the representative basemap 940 corresponds to a different player position (P). Hence, the selectively enhanced resolution basemap can be dynamically produced and can thus selectively enhance the resolution of tiles that are proximate to the current player position (P). As the player position changes, the basemap can be dynamically updated such that the high-resolution region(s) in effect follows the movement of the player. Comparing the representative basemap 920 shown in FIG. 9B with the representative basemap 940 shown in FIG. 9C, one can see that those tiles adjacent the player position can differ as the player position changes and thus dynamically rendering the representative basemap with selectively enhanced tiles thereof.

In one implementation, tiles can be grouped in levels depending on their resolution, with each tile containing a portion of a basemap. The level numbering can start with zero, which corresponds to the tiles covering the entire basemap in a very coarse way (so called base resolution), and then the level numbering can increase as the tiles get closer to the player's position relative to the basemap. Computationally, each tile can be given the same amount of resources available to describe or render the region it covers. This allows to high-level tiles to be rendered at higher resolution than low-level resolution tiles. As the player moves, different high-resolution tiles can be generated and old high-resolution tiles that are no longer need to be at a higher resolution can be merged with neighboring tiles (to dynamically manage resources). If desired, the total number of tiles can be fixed to a given value. At every partition (or split) of a tile level, the area of the tile, is divided by four. In this way, each tile gets the resources to describe four times more detail than before. In other words, tiles can be continuously destroyed and recreated. As an example, when a player moves from a first position to a second position, the resolution of the tiles adapt as the player moves, and tiles previously rendered at high resolution can be merged together and thus returned to a lower resolution.

Figure 10A:
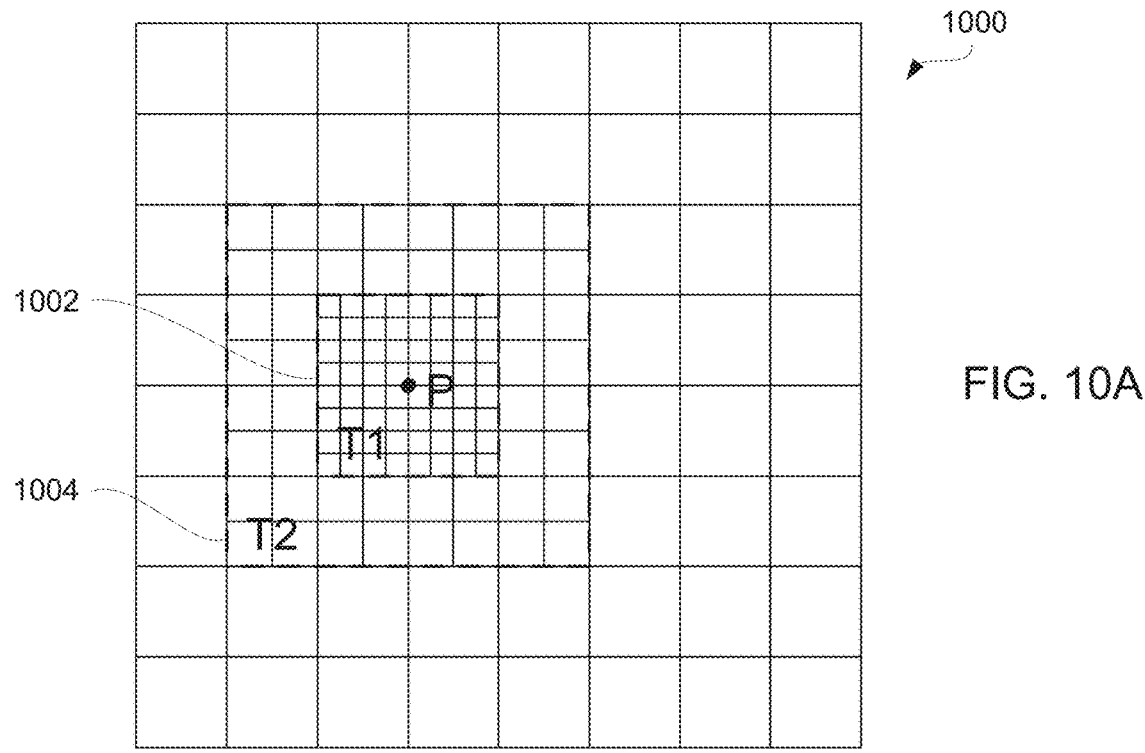
FIGS. 10A and 10B illustrate of a basemap having a high-resolution region and a low-resolution region according to one embodiment.
Figure 10B:
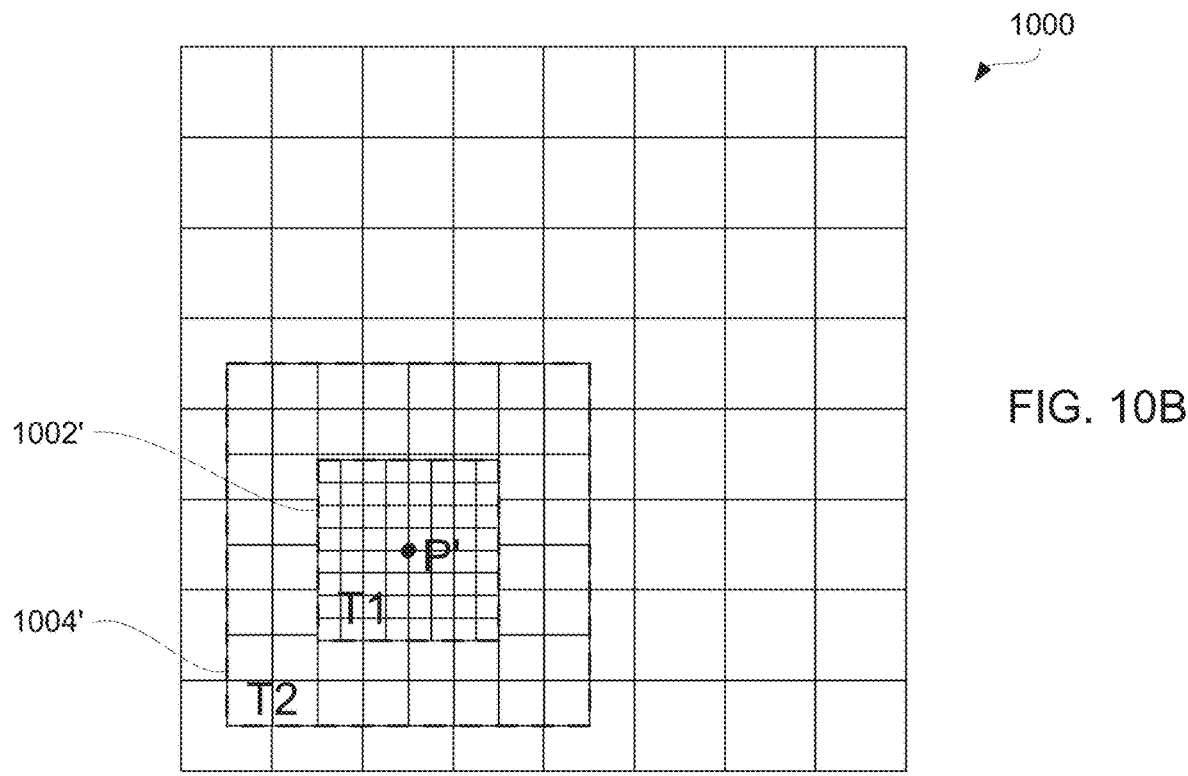

FIGS. 10A and 10B illustrate of a basemap 1000 having a high-resolution region (T1) 1002 and a lower-resolution region (T2) 1004 according to one embodiment. The remaining region of the basemap 100 (excluding regions T1 and T2) can be referred to as a base-resolution region. FIG. 10A is an illustration of the basemap 1000 having the high-resolution region (T1) 1002 and the lower-resolution region (T2) 1004 relative to an updated player position (P). The basemap 1000 is partitioned into a plurality of tiles. The basemap 1000 can pertain to a terrain. In FIG. 10A, the high-resolution region (T1) 1002 is centered around a player position (P). Each of the tiles within the high-resolution region (T1) 1002 are render at a high resolution. Each of the tiles within the lower-resolution region (T2) 1004 that are also outside the high-resolution region (T1) 1002 are rendered at a lower resolution. Each of the remaining tiles not in either the high-resolution region (T1) 1002 or the lower-resolution region (T2) are rendered at a base resolution which is a resolution lower than the resolution of the tiles in the lower-resolution region (T2). As the player position (P) moves relative to the basemap 1000, the high-resolution region (T1) 1002 and the lower-resolution region (T2) 1004 can adapt and thus change.

FIG. 10B is an illustration of the basemap 1000 having the high-resolution region (T1) 1002' and the lower-resolution region (T2) 1004' relative to an updated player position (P'). Since the updated player position (P') is different than the player position (P) shown in FIG. 10A, (i) the corresponding tiles within the high-resolution region (T1) 1002' are different than those in the high-resolution region (T1) 1002, and (ii) the corresponding tiles within the lower-resolution region (T2) 1004' are different than those in the lower-resolution region (T2) 1004. Hence, as the player moves through the terrain represented by the basemap 1000, the high-resolution tiles and the lower-resolution tiles are dynamically determined. With this approach, the processing and memory requirements on a player's gaming device are manageable and thus not overloaded. The player's experience with the terrain is realistic and high quality, such as being crisp and rich in details. As an example, the basemap 1000 can have a base resolution of 1×, a lower resolution of 2×, and a high resolution of 4×.

The partitioning process can split the basemap into tiles of different dimensions, where smaller tile sizes yield higher resolution. Each tile can have the same resources available for its graphical rendering. Therefore, the higher resolution areas of the basemap can be rendered using the smaller tiles.

In one embodiment, to increase the resolution of tiles, several different machine learning agents can be applied. These agents can increase the resolution by determining what covers the ground and which objects are placed over it. In the case of ground terrain, the machine learning agents can include: a resolution enhancement agent, population agents (e.g., one for ground objects and another agent for trees), and a ground coverage agent. The various agents can be trained using data procedurally generated using the Houdini software package. For example, the resolution enhancement agent can be a Super Resolution GAN (SR-GAN) agent. As a player moves over the terrain, the various agents can be called for all tiles at all levels. For low-resolution tiles, little or no content need be generated. Each tile can be assigned a unique ID and the agents being used are deterministic. Temporarily destroying a tile does not affect its content, as its content can be regenerated afterwards.

Each region of the quadtree can be referred to a quad and the data contained in a quad forms a tile. The quads and tiles can be referenced by coordinates. The quadtree partitioning system can split a 2D or 3D surface into quads. A basic assumption is that all tiles can be produced independently. Individual quads and tiles can be identified using logical coordinates or physical coordinates.

With logical coordinates, each quad or tile is identified by three values: its level in the quadtree scheme (0 is the level of the entire base region) and its (tx, ty) coordinates at this level. For tx and ty we set the origin in the lower left corner and require tx, ty$\in$ [0, $2^{level}$–1]. Mathematically, logical coordinates are of the type (level, tx, ty). Tile (0, 0, 0) can contains data corresponding to the whole basemap, at a coarse resolution. Higher level tiles contain only part of the data, but rendered at higher resolution (the higher the level, the higher the resolution).

Alternatively, physical coordinates (Ox, Oy; l) can be used. With these, each quad is characterized by the horizontal (Ox) and vertical (Oy) distance of its bottom left corner from the center of the quadtree system, expressed as a function of l and of the logical coordinates (tx, ty):

$$l = \frac{L}{2^{level}}$$

$$ox = -\frac{L}{2} + l \cdot tx$$

$$oy = -\frac{L}{2} + l \cdot ty$$

While logical coordinates apply to both quads and tiles, physical coordinates are only applicable to quads. In one embodiment, the origin of a tile can be considered to be at its bottom-left corner. In this way, the physical coordinates of a tile in virtual world space will remain the same, but coordinates within a tile will go from (0, 0) to (L, L) with L being the size of a tile.

Figure 10C:
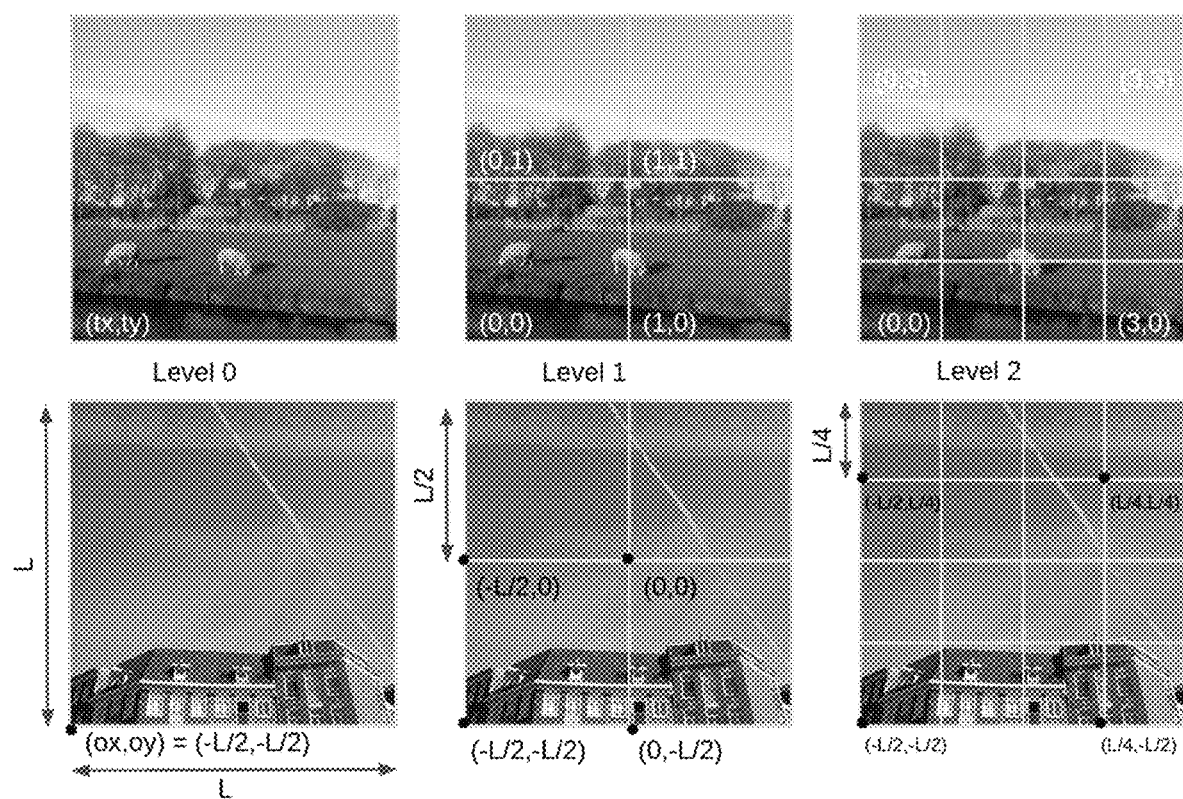
FIG. 10C illustrates tiles produced using a quadtree splitting system that are characterized using logical or physical coordinates, according to one embodiment.

FIG. 10C illustrates tiles produced using a quadtree splitting system that are characterized using logical (top) or physical coordinates (bottom), according to one embodiment. In both coordinate systems, the level of a tile depends on the number of times the considered data distribution has been divided. In other words, a level two tile is the result of two splitting operations and consists of data rendered at higher resolution than the data in a level one tile. With logical coordinates, the lower left corner is (0, 0) and each tile or quad has coordinates (level, tx, ty), with tx, ty $\in$ [0, $2^{level}$–1]. Using logical coordinates, each tile is characterized by a triplet (Ox, Oy, l), where:

$$l = \frac{L}{2^{level}} \cdot ox = -\frac{L}{2} - + l \cdot tx \cdot oy = -\frac{L}{2} + l \cdot ty.$$

One embodiment for determining whether to split (or subdivide) a quad can be in accordance with the following pseudocode:

1: Provide as input the camera position, the screen size, the field of view and the desired number of pixels per texture element ("texel")
2: Calculate the physical coordinates of the tile, (ox, oy, l)
3: Calculate the distance between the player and a tile. For a given position (x,ly) of the player, the distance d is calculated as
4: d:max(min(lx–oxl, |x–ox–L•=), min(ly–oyl, ly–oy–L•=))

5: if d<KL then
6: Split the tile and the quad
7: end if

In other words, a quad can be subdivided if the distance of the player from the quad is less than K times its size, with K being the split distance factor, which determines how quads are subdivided. The higher the K value, the sooner quads are divided and the smaller they are rendered on screen. The subdivision lgorithm can be implemented as a plugin used to render agent-generated data in Unity, such a subdivision algorithm, and it can be referred to herein as Daedalus.

Figure 10D:
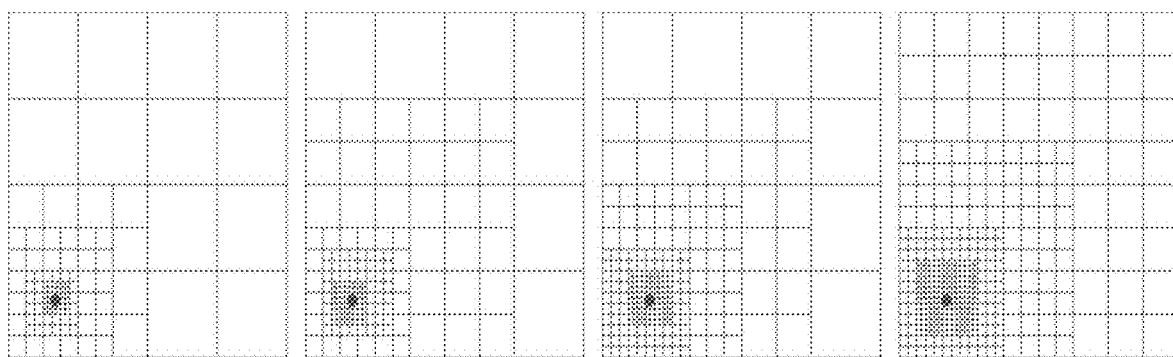
FIG. 10D illustrates quadtree partitioning with regard to separation factor according to one embodiment.
Figure 10E:
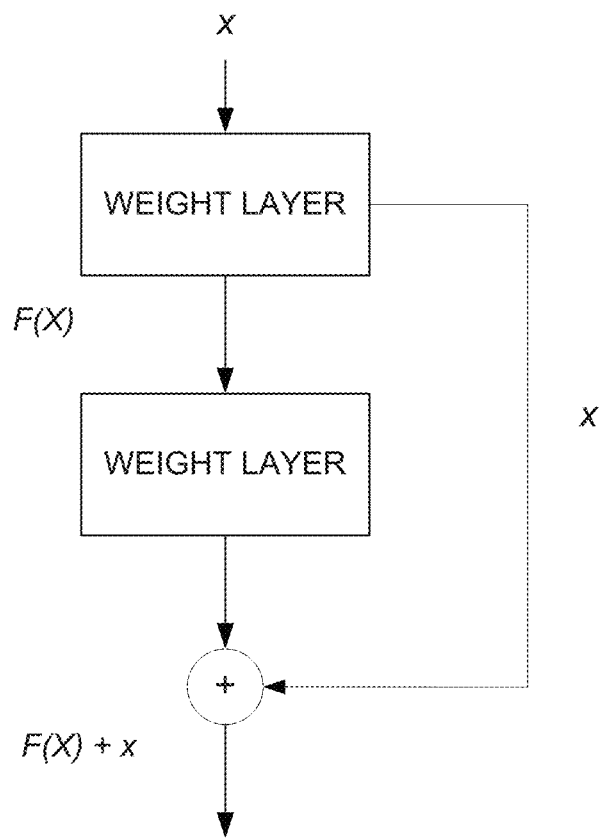
FIG. 10E illustrates a computational diagram of a generator for a resolution enhancement agent.

FIG. 10D illustrates quadtree partitioning with regard to separation factor according to one embodiment. As illustrated, the separation factor K used with quadtree subdivision varies from left-to-right, as K=1.1, 1.5, 2.0 and 2.8. The location of the player is marked by a solid dot. As illustrated, the higher the value of K, the finer the quads are divided.

Resolution Enhancement Agent

The resolution enhancement agent is used to generate realistic high-resolution terrain. The resolution enhancement agent can be used to increase resolution of a given basemap region. The resolution enhancement agent can be implemented as a neural network trained to increase the resolution of a basemap region by adding more (or finer) details. The resolution enhancement agent can increase the resolution of a region by increasing the amount of information it contains. With a quadtree partitioning scheme, the number of pixels available to store information for a given basemap region increases at every split. As a result, a given basemap region has increased space to store additional information generated by the resolution enhancement agent.

In one embodiment, a resolution enhancement agent can have been trained using Houdini-generated data. Houdini is a software suite developed by SideFX. Additional information can be found in SideFX's documentation concerning a heuristic workflow using the heightfield tools, based on experience generating realistic-looking terrain, entitled "Realistic terrain with heightfields".

A procedural landscape generation and population model can be used in the Houdini software for training data. Technical artists can generate terrain starting from a list of features-defining rules (e.g., for weather erosion, animal paths, etc.). By varying the parameters of the features, a large set of maps (up to several thousand elements) can be generated and then used for training the different agents. Each time an agent is trained, the goal is to learn some specific features of the generated maps, such as the orographic features, or how trees are distributed. In this way, new maps can be automatically generated by applying the style of the artist which developed the procedural landscape generation and population model.

The resolution enhancement agent can then be trained using a dataset procedurally generated by Houdini. In one embodiment, where the map pertains to a terrain, the elements of the training dataset are maps storing information on ground elevation and on what covers the ground, described using labels. For example, one training map can include, among others, labels indicating the location of streams and water bodies. Another training map for the same region can, for example, provide an approximation of a splatmap, illustrating how different textures are combined. Still another training map can, for example, show distribution of coniferous and/or deciduous trees population.

In one embodiment, the resolution enhancement agent can be trained using data generated procedurally (following a set of artist-defined rules) in Houdini. The map generation workflow can be designed to generate thousands of maps of arbitrary size. Each map can contain the standard elevation information usually stored in a basemap, together with labels describing which elements cover the map surface. The map generation workflow can be designed to take into account the location where the game play takes place. More precisely, to render a particular terrain for a game, the training data can be custom to that type of terrain. For example, if the terrain for game play is within a Black Forest, the training data can provide a Black Forest like flavor by including operations mimicking features of that environment, such as geological erosion caused by water flow and by thermal weathering, for example. The training data can then generate a set of maps with the "look and feel" of the Black Forest. Some trial and error can be performed to determined which operations return basemaps most similar to those typical of the Black Forest. In the case of Houdini, the training maps can be saved using the .npy format, as NumPy arrays, see NumPy homepage, before using them for training the resolution enhancement agent. Alternatively, the training maps could be saved in the .geo format.

In one embodiment, the resolution enhancement agent can receive three types of data as inputs: elevation data, masks, and coverage information.

The elevation data can contain information on the elevation profile of a basemap tile. The elevation data can be stored using one channel and can have a shape of (1, 1, w, h), where w and h are the width and the height of a tile, in pixels. In one implementation, the height and width can be 32 pixels, though these values can vary widely depending on implementation.

The masks can contain information on ground coverage, such as the location of water bodies and exposed bedrock, for example. The masks can store data in two channels and can have a shape of (1, 2, w, h), where w and h are the width and the height of a tile, in pixels. For example, the first channel can store information on the distribution of water bodies, and the second channel can store information on the location of exposed bedrock.

The coverage information can describe the resolution of a tile. The coverage information can include a coverage vector. In one implementation, the coverage vector can have a size (1,9) and each of its elements can represent a different resolution level. For example, a coverage vector [1, 0, 0, 0, 0, 0, 0, 0, 0] can correspond to a resolution of 32 m.

In one implementation, the elevation data and masks can be obtained from maps generated using Houdini, which can have a resolution of 0.25 m. These maps can then be down-sampled to the desired low-resolution version, such as resolution in the range from 0.25 m to 32 m.

As outputs, the resolution enhancement agent returns elevation data and masks of the associated tile. Hence, in summary, the resolution enhancement agent can receive as inputs a low-resolution tile characterized by (i) elevation data, masks and (iii) coverage information. The outputs then of the resolution enhancement agent are (i) an increased-resolution tile characterized by elevation data and (ii) masks.

In one embodiment, to increase the resolution of a basemap tile, a resolution enhancement agent based on Super Resolution GAN (SRGAN) can be used. SRGAN is designed to improve resolution of images. Starting from a low-resolution version of an image, SRGAN can reconstruct the original high-resolution version. SRGAN was described in Ledig et al., "Photo-realistic single image super-resolution using a generative adversarial network," Proceedings of the IEEE conference on computer vision and pattern recognition, pages 4681-4690, 2017.

In one implementation, an ad-hoc adaptation of SRGAN can be used as the resolution enhancement agent. To reduce computational cost, most operations can be done at low resolution (32×32 pixels) with its output at high resolution (64×64 pixels). As common with GANs, the architecture of the resolution enhancement agent includes a generator and a discriminator. In one embodiment, the generator can include eight major residual blocks, each consisting of a series of secondary residual blocks, batch normalization, ReLU and convolution operations. For additional information concerning GAN architecture see, e.g., He et al., "Deep residual learning for image recognition," Proceedings of the IEEE conference on computer vision and pattern recognition, pages 770-778, 2016; Goodfellow et al., "Deep learning," MIT press, 2016.

FIG. 1OE illustrates a computational diagram of a generator for a resolution enhancement agent. The computational diagram provides for residual blocks. In general, a residual block is a structure that can be introduced so that deep networks do not perform worse than shallow networks. The general idea of residual blocks is to use an identity operator, which works as follows:
1. Start from an input x.
2. Apply a set of operations F: x–F(x).
3. Sum the initial input x to F(x).

Shallow network and deep network are two expressions commonly used in machine learning to quantify the complexity of a neural network. Every neural network consists of an input layer and an output layer. Any additional layer between the input and the output layer is called a hidden layer. Neural networks with one or two hidden layers are referred to as shallow neural networks. Networks with more than two layers are referred to as deep neural networks. An unwanted effect of using a deep neural network is that it could perform worse than a shallow neural network. The use of residual blocks serves to mitigate this unwanted effect.

Here, the resolution of basemap tiles can be increased using a modified version of SRGAN. One feature of SRGAN is the use of residual blocks, sets of operations here denoted using F. Summing the original input to the output, residual blocks help avoiding information loss. An advantage of this architecture is that if a set of operations is unnecessary, such operations can be skipped without losing the original information.

As noted, the resolution enhancement agent can use a generator in increasing resolution of appropriate regions of a basemap. According to one embodiment, the generator can receive as inputs three types of information about a region (e.g., tile) of a basemap, namely, elevation data, mask information and coverage information, and outputs enhanced elevation data and masks for the enhanced resolution region. Two features of the generator are the use of residual blocks, which serve to limit the loss of information, and the use nearest neighbors as a guiding function.

Figure 11:
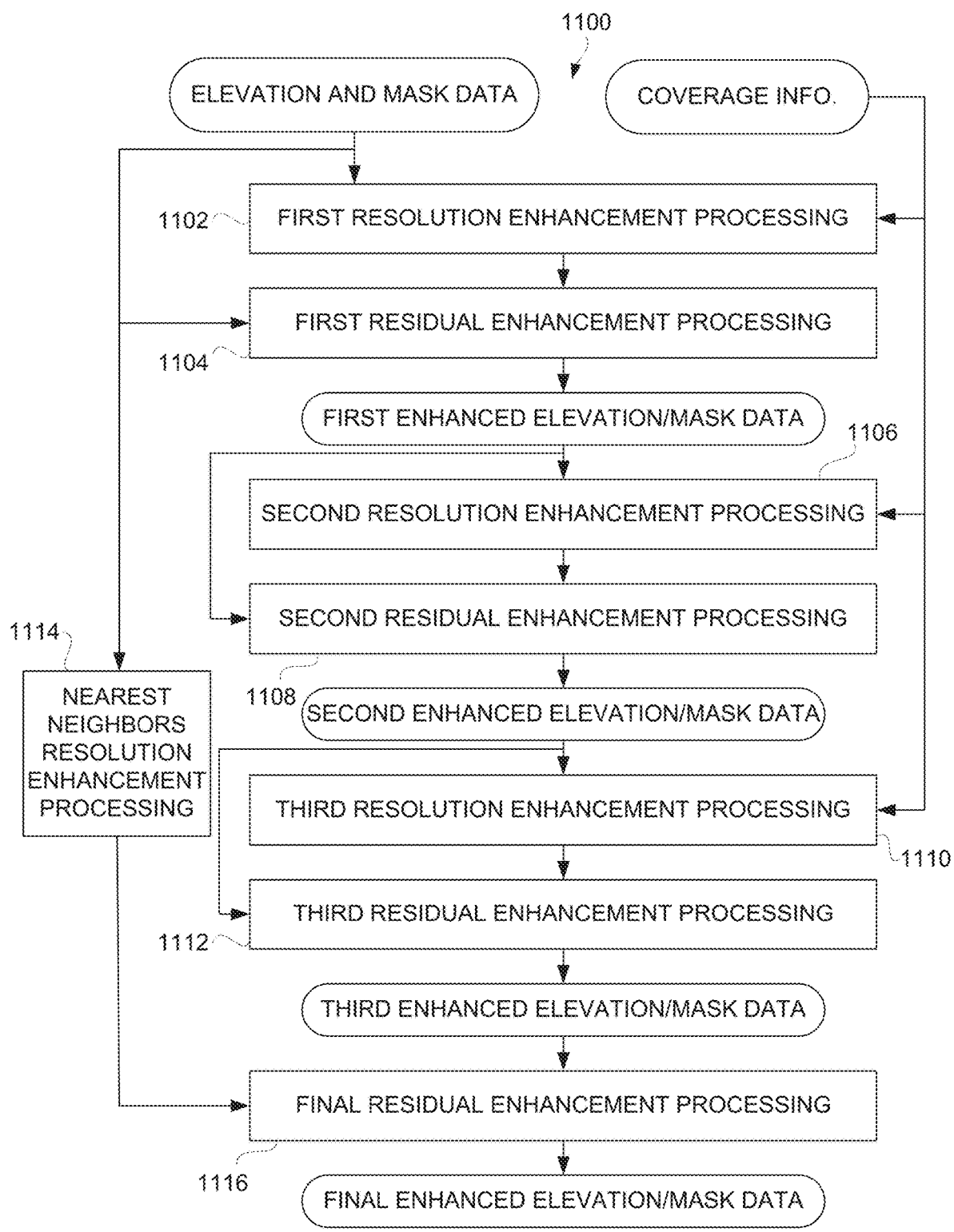
FIG. 11 is a diagram of a processing architecture for a generator of a resolution enhancement agent according to one embodiment.

FIG. 11 is a diagram of a processing architecture 1100 for a generator of a resolution enhancement agent according to one embodiment. The generator processing architecture 1100 performs first resolution enhancement processing 1102. The first resolution enhancement processing 1102 receives elevation and mask data, which includes elevation data that is to be enhanced as well as mask information. In addition, the first resolution enhancement processing 1102 receives coverage information. From these inputs, the first resolution enhancement processing 1102 produces enhanced data which is supplied to a first residual block processing 1104. The first residual block processing 1104 also includes the native (un-enhanced) elevation and mask data. Following the residual block processing of the first residual block processing 1104, first enhanced elevation and mask data is output.

Next, if still greater resolution enhancement is desired, the processing blocks similar to blocks 1102 and 1104 can be repeatedly performed to successively increase the resolution. In this example illustrated in FIG. 11, the processing is repeated two additional times as described below. In this regard, the first enhanced elevation and mask data are provided to a second resolution enhancement processing 1106. The output data from the second resolution enhancement processing 1106 is supplied to a second residual block processing 1108. The second residual block processing 1108 also receives the first enhanced elevation and mask data. Following the residual block processing of the second residual block processing 1108, second enhanced elevation and mask data are output.

Next, the second enhanced elevation and mask data is provided to a third resolution enhancement processing 1110. The output data from the third resolution enhancement processing 1110 is supplied to a third residual block processing 1112. The third residual block processing 1112 also receives the second enhanced elevation and mask data. Following the residual block processing of the third residual block processing 1112, third enhanced elevation and mask data are output.

Thereafter, as a final stage of processing, the native elevation and mask data can be supplied to a nearest neighbors resolution enhancement processing 1114. The third enhanced elevation and mask data can be provided to a final residual block processing 1116. The final residual block processing 1116 can also receive the output data from the nearest neighbors resolution enhancement processing 1114. Following the final residual block processing 1116, final enhanced elevation and mask data can be output.

In the processing architecture 1100 illustrated in FIG. 11, there are four stages, which can provide a resolution increase of four times (4×). However, the number of stages can vary with implementation. Hence, in another embodiment, the processing architecture could include eight stages to yield a resolution increase of eight times (8×).

According to one embodiment, the structure of the resolution enhancement generator can be described in pseudo-code as follows:
 1: Provide as input elevation data and masks
 2: Provide information on coverage
 3: Perform resolution increase operations
 4: Add elevation data and mask information
 5: for i E [1, 8] do
 6: Provide coverage information
 7: Perform resolution increase operations
 8: Add previously resolution increased elevation data
 9: end for
 10: Perform resolution increase operations
 11: Add elevation resolution increased using nearest neighbors method
 12: Output: resolution increased elevation data and masks For a tile undergoing resolution enhancement, the coverage data provides information on the resolution of the input data. This is useful because even if the operation of the resolution enhancement agent is fundamentally the same, it can act differently at different resolutions. In detail, the coverage data is passed to a linear layer which shifts the elevation values from $\{zi\}$ to $\{zi'\}$, with $Zi'$ defined as:

$z_i' = \alpha \times z_i \pm \beta$.

where the coefficients $\alpha$ and $\beta$ are determined by the network. Considering the architecture of the generator of the resolution enhancement agent, after all the residual blocks, the resolution increased elevation data can be summed with the same data whose resolution was increased using the nearest neighbor approach. In other words, the nearest neighbor approach can be used as a guide for the resolution enhancement agent. Although the resolution enhancement agent can utilize a nearest neighbors approach as discussed above, a neural network approach can alternatively be utilized.

In one embodiment, the discriminator of the resolution enhancement agent can be a Markovian discriminator. For example, the discriminator can be implemented as a Patch-GAN. In training the resolution enhancement agent, resolution enhanced images can be labeled true or false, and the perceptual distance between images can be measured. Instead of classifying entire images as real or fake, PatchGAN considers regions of N×N pixels, where N can be much smaller than the entire image size and still produce high quality results. Additional information on PatchGAN can be found in Isola et al., "Image-to-image translation with conditional adversarial networks," Proceedings of the IEEE conference on computer vision and pattern recognition, pages 1125-1134, 2017.

In one implementation, the resolution enhancement agent can take four channels data as input and can output a three-channel tensor. Table 3 below indicates details of inputs to a resolution enhancement agent, according to one embodiment. Table 4 below indicates details of output from a resolution enhancement agent, according to one embodiment.

TABLE 3

| Name (in model) | Data Shape | Data Range | Data Channels | Data Type |
|---|---|---|---|---|
| low_res_elevation | (?, 1, 32, 32) | [−1, 1] | 1-elevation | Float32 |
| low_res_masks | (?, 2, 32, 32) | [−1, 1] | 1-water; 2-bedrock | Float32 |
| coverage | (?, 1) | [−1, N_levels] | 1-coverage | Float32 |

TABLE 4

| Name (in model) | Data Shape | Data Range | Data Channels | Data Type |
|---|---|---|---|---|
| Elevation | (?, 1, 64, 65) | [−1, 1] | 1-elevation | Float32 |
| Masks | (?, 2, 64, 64) | [−1, 1] | 1-water; 2-bedrock | Float32 |

The resolution enhancement agent can be trained using a dataset of Houdini-generated tiles from different resolution levels. In this way, the resolution enhancement agent can increase resolution of regions of different sizes.

By using a multiscale training dataset, the resolution enhancement agent can be applied to basemap regions of different size. Also, by applying the agent multiple times, the spatial resolution of a basemap can be increased many times, such as from 32 m to 0.25 m. Each time the resolution enhancement agent is applied, the resolution of a map (e.g., terrain map) can be doubled. By consecutively applying the resolution enhancement agent, the resolution of a basemap tile can be increased many times (e.g., 128 times), as noted in Table 5 below.

TABLE 5

| Initial Resolution | Output Resolution | Resolution Increase |
|---|---|---|
| 32 m | 16 m | x2 |
| 16 m | 8 m | x2 |
| 8 m | 4 m | x2 |
| 4 m | 2 m | x2 |
| 2 m | 1 m | x2 |
| 1 m | 0.5 m | x2 |
| 0.5 m | 0.25 m | x2 |

In one implementation, the resolution enhancement model can be implemented in PyTorch, an open source machine learning library based on the Torch library. After training the resolution enhancement model, the model can be stored as an agent using the .onnx file format.

Ground Coverage

Following resolution enhancement of select regions of a basemap, further processing can be performed to populate ground coverage. The processing, for example, can determine the location of objects used to populate a terrain, together with their features. For example, in an effort to mimic the natural terrain, such as a forest, the processing can determine if trees should be present, where they should be located, and what species and height each tree should take.

The Houdini software platform can be used to implement a procedural landscape generation and population model. A technical artist can generate terrain starting from a list of features-defining rules (e.g., based on weather erosion, animal paths, etc.). By varying parameters of the features, a large set (up to several thousands) of possible maps can be computer generated. The generated maps can then be used to train machine learning agents. Each time an agent is trained, it normally learns some specific features of the generated maps (such as the orographic features, or how trees are distributed).

In game development, textures (e.g., ground textures), are images which are applied to the surface of 2D or 3D objects. By applying different textures, the same 2D or 3D object can be rendered in different ways.

A ground texture agent can determine what covers the ground of each specific region (e.g., tile) of the virtual game world. As inputs, the ground texture agent can consider the following attributes of a given tile:

1. Elevation values and masks generated by a resolution enhancement agent.
2. Type and scale of the assets to be placed, as defined by a population agent.
3. Resolution of the tile to be covered with texture.

The ground texture agent can return an eight-channel splatmap, where each channel describes the probability that the ground of the considered region is covered by the corresponding texture material. Table 6 presents the information stored in each channel of the splatmap, according to one embodiment.

Inputs of the ground texture agent for one embodiment are presented in detail in Table 7. Elevation values and masks can be generated by the resolution enhancement agent. Type and scale of the trees can be generated by the population agent. As with the resolution enhancement agent, coverage information is a number characterizing the level of the considered region (e.g., tile).

Table 8 illustrates that the ground texture agent increases resolution of the considered region (e.g., tile) by using a nearest neighbor interpolation. When the input information is 32×32 pixels, the output information in the splatmap is 64×64 pixels.

TABLE 6

| Channel Number | Label |
|---|---|
| 0 | Ferns |
| 1 | Grass |
| 2 | Leaves |
| 3 | Moss |
| 4 | Pebbles |
| 5 | Rocks |
| 5 | Roots |
| 7 | Soil |

TABLE 7

| Input Name Type | Shape | Range | Channels | Data |
|---|---|---|---|---|
| Elevation | (?, 1, 32, 32) | [−1, 1] | 1 - Elevation | Float32 |
| Masks | (?, 2, 32, 32) | [−1, 1] | 1 - Waterbeds 2 - Bedrock | Float32 |
| Tree_labels_in | (?, 1, 32, 32) | [−1, 1] | 1 - Asset types | Float32 |
| Tree_scale_in | (?, 1, 32, 32) | [−1, 1] | 1 - Asset scale | Float32 |
| Coverage Information | (?, 8) | [0, 1] | Hot encoded vector | Float32 |

TABLE 8

| Input Name | Shape | Range | Channels | Data Type |
|---|---|---|---|---|
| Splatmap | (?, 8, 64, 64) | [0, 1] | 1-8-channel splatmap | Float32 |

The ground texture agent can be trained using an adversarial approach, and can have an architecture including a generator and a discriminator.

The architecture of the generator can make use of a resolution enhancement operation, a U-Net with skip connections, and a softmax operation. Skip connections work similarly to residual blocks, and similarly allows reinjection of information that was already provided, thus limiting the relevance of the intermediate operations. For additional information, see (i) Ronneberger et al., "U-net: Convolutional networks for biomedical image segmentation," International Conference on Medical image computing and computer-assisted intervention, pages 234-241, Spring, 2015; (ii) Multi-Class Neural Networks: Softmax; and (iii) Kuma, "Skip connections and Residual blocks".

The inputs can be separately provided to the generator of the ground texture agent. Before feeding the input data to the U-Net, the size can be increased using a nearest neighbor interpolation. In one implementation, the enhance resolution agent, the population agent and the ground texture agent can be run concurrently to improve execution speed. Considering input data of size 32×32 pixels, a single resolution enhancement agent can operate initially to return data of size 64×64 pixels. Since all agents are called only when a new tile needs to be formed, a resolution enhancement agent can be considered in the generator architecture of the ground texture agent. The resulting data after the size increase can be supplied to the U-net where a convolution operation outputs an eight-channel image. As a last step, a SoftMax operation is in place to ensure that for each pixel the sum of the values stored in the different channels of the splatmap is one. This is equivalent to checking that all possible materials are chosen: given all the possible outcomes an event can have; the sum of the relative probabilities is always one.

Similar to the resolution enhancement agent, the discriminator for the ground texture agent can use a Markovian/PatchGAN approach. To compute the loss function of the discriminator, a combination of the L1 loss function, the standard GAN loss function, and the feature loss can be used. For additional information, see Isola et al., "Image-to-image translation with conditional adversarial networks," Proceedings of the IEEE conference on computer vision and pattern recognition, pages 1125-1134, 2017.

One of the inputs provided to the ground texture agent is the coverage information, which characterizes the resolution of the corresponding tile. The ground texture agent can be used to place texture on map regions having different resolutions. This can be achieved with the same ground texture agent because the ground texture agent (e.g., the generator thereof) was trained using a training dataset consisting of textures with different resolutions. The training dataset can make use of a database of splatmaps with different resolutions. For example, in a course resolution one pixel might correspond to 16.0 meters, in a first intermediate resolution one pixel might correspond to 8.0 meters, in a second intermediate resolution one pixel might correspond to 4.0 meters, and in a fine resolution one pixel might correspond to 2.0 meters.

In Unity, a plugin is an external library which provides functionalities that are not included in the standard distribution. Deadalus is a Unity plugin, developed by Playerunknown Productions a studio from PUBG Corporation, to circumvent some of Unity's limitations and allow games to run on it In its standard implementation, Unity is designed to execute all commands on the CPU main thread. When complex environments need to be rendered, this is not enough processing power. To satisfy this requirement Unity recently developed the multithreaded Data-Oriented Technology Stack (DOTS), which allows to run code on multiple CPU threads. DOTS requires using a specific data structure, which optimizes performance. DOTS uses a Burst Compiler that is designed to enable faster processing. For additional information, see (i) Unity Manual, Unity DOTS webpage, and (ii) Unity Manual, Burst User Guide. DOTS can stream data, but is not designed to handle data generated at runtime. Daedalus allows data to be generated on-demand (e.g., runtime), and allows such data to be streamed continuously.

Daedalus is configured to handle both large environments and large amounts of objects or structures. The solution implemented is based on data streaming, which allows for portions of a virtual world to be built at runtime using machine learning agents. This is fundamentally different from the classical approach, where a virtual game world is handcrafted by designers. Instead, according to one embodiment, a virtual game world by configuring machine learning agents whom then produce the virtual game world. From a programmer's perspective, Daedalus can be implemented in a native C++ library (dll) optimized for speed and is this able to produce the virtual game world at runtime.

Unity does not natively support streaming data generated "on demand" by agents. In other words, in standard Unity the world is unique, static and it never changes. In one embodiment, using Daedalus, at every frame, data flows between the game world, where the game takes place, and the streaming world, where agents produce content.

Figure 12:
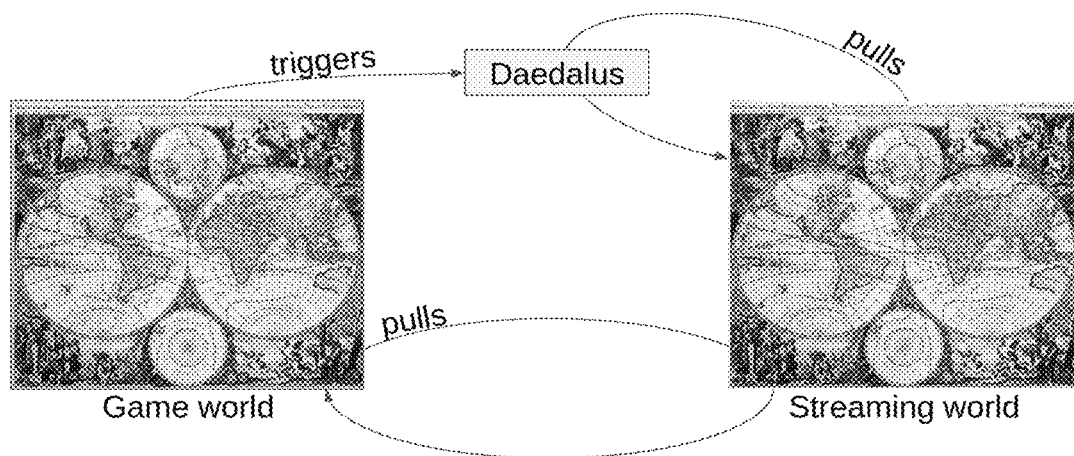
FIG. 12 is a schematic diagram of how a Unity plugin, can connects two Unity worlds: a game world and a streaming world, according to one embodiment.

FIG. 12 is a schematic diagram of how Daedalus, a unity plugin, can connects two Unity worlds: a game world and a streaming world, according to one embodiment. The game world is where the game takes place. The streaming world is where raw data is converted into Unity-specific data types.

Whenever a new object needs to be generated, the game world triggers Daedalus, which consists of a set of data-generating functions. Daedalus is the environment where the tiles are created and merged, and where the data for each tile is generated. The streaming world then pulls the generated data from Daedalus, and the game world pulls the data from the streaming world.

As illustrated in FIG. 12, the two worlds and Daedalus can interact as follows:
1. Character movement in the game world trigger Daedalus
2. Daedalus generates data
3. The streaming world pulls data from Daedalus
4. In the streaming world, Daedalus-produced data is converted into Unity-specific data types
5. Streaming world data is pulled by the game world The steps listed above are normally repeated at every frame, to provide the player a smooth game experience.

Using Daedalus, a feedback loop can be established between the two worlds: the actions of a player are passed as input to Daedalus, which determines what content needs to be generated. After generating data using the relevant agents, Daedalus passes the data to the streaming world, where the new information can be rendered in Unity. Lastly, data can be pushed from the streaming world to the game world, where it is visualized in the next frame.

Figure 13:
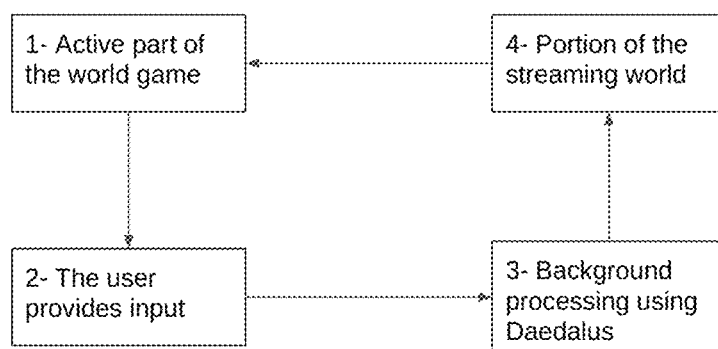
FIG. 13 illustrates a flow diagram of a streaming process according to one embodiment.

FIG. 13 illustrates a flow diagram of a streaming process according to one embodiment. In the scheme as shown in FIG. 13, in state 1, the portion of the game world containing the player is considered. In state 2, the user provides an input, which is then passed to the Daedalus plugin (state 3). Using the appropriate machine learning agents, Daedalus generates the content necessary to take into account the input from the player and give the player a coherent game experience. For example, if the player changes her position on the terrain, Daedalus can determine which tiles need to be merged and which ones need to be split, and generates content for the new tiles. Data is then passed to the streaming world (state 4). At state 4, raw data can be imported into Unity. Lastly, the new game scene is ported from the streaming world to the game world, such that the active part of the game world dynamically updates.

Deadalus can be implemented in C++ instead that in C#, the default scripting language of Unity. It is more advantageous to use C++ code because it can be processed by a Burst Compiler. Additionally, C++ code has full control over how memory is managed, and can use external libraries for heavy lifting tasks. C++ code also makes Daedalus easily portable to another engine (e.g., such as Unreal).

In computer graphics, real-time rendering is the field studying how images are produced and displayed on a screen in real-time. Images are produced taking into account input or feedback from a user (e.g., player). For instance, an image appears on a screen, the user views or reacts, and this action can determine or influence what is generated next. The cycle of reaction and rendering happens fast enough that the viewer feels immersed in a dynamic process.

The main two parameters characterizing the quality of real-time rendering are the number of frames generated per second and the temporal delay at which images are shown. The rate at which images can be displayed is measured in frames per second (fps) or Hertz (Hz). The user starts to have a sense of interactivity at 6 fps and for fps>15 can be considered as display in real-time. New images should be generated and displayed with not more than 15 milliseconds of delay if player experience is not hindered.

The core component of real-time rendering is a graphics rendering pipeline. The main function of the graphics rendering pipeline is to generate (or render) a two-dimensional image given a virtual camera, three-dimensional objects, light sources, shading equations, texture, etc. In 2018, Unity introduced the High Definition Rendering Pipeline (HDRP), a scriptable high-fidelity rendering pipeline. See "High Definition Render Pipeline overview," High Definition RP, version 7.1.6, Manual, www.unity3d.com. Once data is generated by Daedalus, the relative scene can be rendered using Unity's HDRP.

Daedalus can be used to populate the game world with agent-generated content. As guidelines, Daedalus has the following support requirements based on consumer hardware: Full HD resolution (1920×1080 pixels); Rendering frame rate: 60 Hz; Maximum character speed: 3 m/s; Average number of new tiles per second: four (one split); and Peak number of splits: one per frame, which corresponds to four new tiles.

To provide a frame rate of 60 fps, the processing should be sufficient to meet performance targets, such as, new frames should be generated in less than 16 ms and the system should be able to handle one tile split per frame.

Daedalus is designed to provide a smooth game experience to the player. Based on the user's hardware, a profiling software can determine an optimal configuration for running Daedalus. The profiling software can consider various properties as shown in Table 9 below.

TABLE 9

| Variable | Range | Description |
| --- | --- | --- |
| Render resolution | From 1280 × 768 pixels to 4K | Resolution can be improved in post processing (upscaling, etc.) |
| Quadtree tile budget | Max. amount of tiles: 512-2048 | Environment is more pleasant with more tiles |
| Render frequency | From 30 to 120 Hz | — |
| Splitting criterium | From 0.25 to 40 | If texels occupy this amount of pixels on screen, then the relative quad will be split |
| Asset LoD count | — | Higher LoD count allows smoother transitions but requires more VRAM. System with less VRAM can use less levels, such as by skipping levels |
| Asset LoD ranges | — | Future version can switch to more detailed representations |
| Filtering | — | Any frame buffer post processing, such as anti-aliasing |
| Field of view | From 50 to 100 degrees | — |

These various properties can determine the performance of Daedalus on the user side. With this approach, Daedalus can provide better performances as hardware specifications improve. These various properties can be explained as follows:

- Render resolution, is the screen resolution used to visualize the rendered images. For example, the screen resolution can range between 1280×786 pixels and 4K (3840×2160) pixels.
- Quadtree tile budget, is the maximum number of tiles the game world can be split into. The quadtree tile budget can go from 512 to 2048. The advantage of using more tiles is that the environment becomes more pleasant to look at.
- Render frequency, is the number of frames per second shown on the screen. For example, the render frequency can range from 30 Hz to 120 Hz.

Splitting criterium, determines which quads will be split or merged. For each quad, it can be a number of pixels per texel (see FIGS. 14-15).

Asset LoD count, is the number of versions of a 3D object, to be rendered at a different Level of Detail (LoD), that is, the number of levels at which an object is rendered.

Asset LoD ranges, is the LoD value range for each asset.

Filtering, can be used to indicate any operation to improve the appearance of a previously rendered object. Technically, these post-processing operations can be performed using framebuffers. A typical post-processing operation is to apply anti-aliasing techniques, to avoid having clear pixel formations at edges.

Field of view, is the extent of the observable game world that is seen on a display at any given moment. It is usually measured as an angle.

Figure 14:
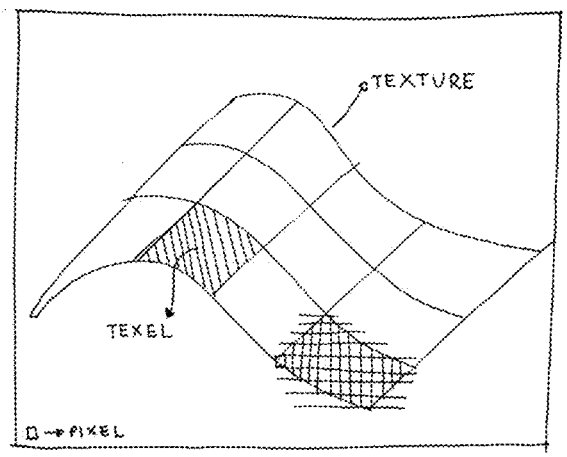
FIG. 14 illustrates an undulated terrain with a texture divided into texels, according to one embodiment.

FIG. 14 illustrates an undulated terrain with a texture divided into texels, according to one embodiment. In computer graphics, a texel is a fundamental unit of a texture map. The number of pixels per texel determines the splitting criterium, which can be used to determine which quad to split or merge.

Figure 15:
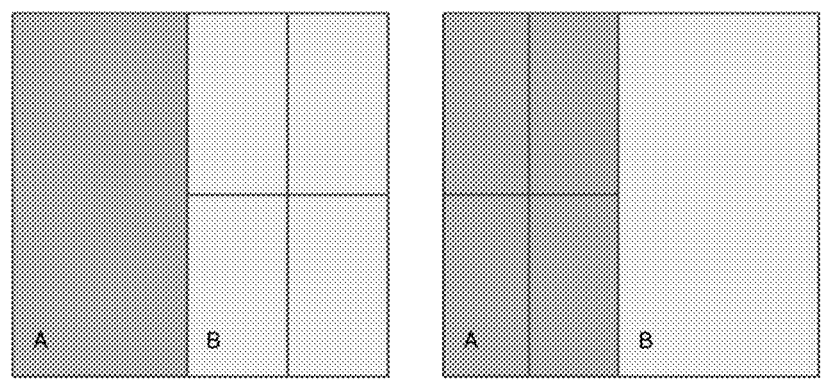
FIG. 15 is a diagram illustrating of a tile "splitting and merging" procedure, according to one embodiment.

FIG. 15 is a diagram illustrating of the tile "splitting and merging" procedure, according to one embodiment. According to this procedure, at every frame, Daedalus can determine which quads need to be split and which to be merged. To do so, it considers the splitting criterium: given a parameter such as the split distance factor K, it calculates its value for all quads and rearranges them accordingly. For example, as depicted in FIG. 15, in the image quad B is already split, while A is not. In a subsequent frame, if $K_A > K_s$, A is split in four while the tiles in B are merged, to preserve the total number of available tiles (quadtree tile budget).

On initialization, Dedalus can perform a series of one-time-only operations to interface with the user hardware. The operations include: heap memory allocation, scratch memory allocation, set static parameters, acquire access to GPU, initialize libraries, build shaders, and allocate GPU buffer. At shutdown, Daedalus releases the GPU, frees all memory and discards the libraries.

In one embodiment, such as in Daedalus, the game world is generated and updated using the so-called data pipeline. This includes all the data generation and transformation tasks, like making the basemap, increasing resolution of tiles using the quadtree splitting system, generating the terrain and so on. In one implementation, at the core of the data pipeline is Daedalus, which is integrated with both the machine learning agents and with the data they generate. Different agents are applied to generate different layers of content, namely the elevation layer, the population layer and the ground texture layer. The following outlines how agents can be integrated in Daedalus to generate data for each layer.

The agents can be stored as .onnx files, which can be executed in Daedalus using TensorRT. In the current version, data is exchanged between Unity and Daedalus using the heap memory API. The data transfer logic is as follows:

1. Every time Unity sends a trigger signal, data is generated by Daedalus.
2. Daedalus communicates to Unity the size of the generated data.
3. Unity allocates the required memory size.
4. Daedalus stores data in the allocated memory. A copy of the generated data can remain on the Daedalus side, available for later use.

These steps require exchanging data between the CPU and the GPU memory. To optimize the communication speed, data can be exchanged data using the PCI bus.

The elevation layer is processed by a machine learning agent, the elevation agent. After the basemap has been generated, the basemap can be converted into a triangle mesh. Once the mesh is generated, the basemap can be rendered in Unity. As a first step to make a basemap playable, colliders, which are invisible objects that define how physical interactions work, can be created. Every tile can have its own collider, so that at every quadtree split the density of colliders can also increases. Once generated, the basemap can remain on the GPU.

The population layer can be processed by the population agent. A given tile may or may not include population data. If the tile contains population data, this is provided as a grid covering the quad region. Once the population agent generates the data, post processing operations are applied to encode all properties in the minimum number of bits.

The ground texture layer can be processed by the ground texture agent. The ground texture layer is used by Unity to cover the surface of the basemap. In one implementation, the ground texture layer generated by the ground texture agent can store weights using eight (8) channels, each relative to a different type of texture. For each channel, the data can be stored as a single float value (8 bits). Each value characterizes the weight that a given texture type has for the considered region. For example, given a region covered at 25% by rocks and at 75% by trees, the weights can be represented by Table 10.

TABLE 10

| Channel | Relative Weight |
| --- | --- |
| 1 | 0 |
| 2 | 0.75 |
| 3 | 0 |
| 4 | 0 |
| 5 | 0 |
| 6 | 0.25 |
| 7 | 0 |
| 8 | 0 |

Figure 16:
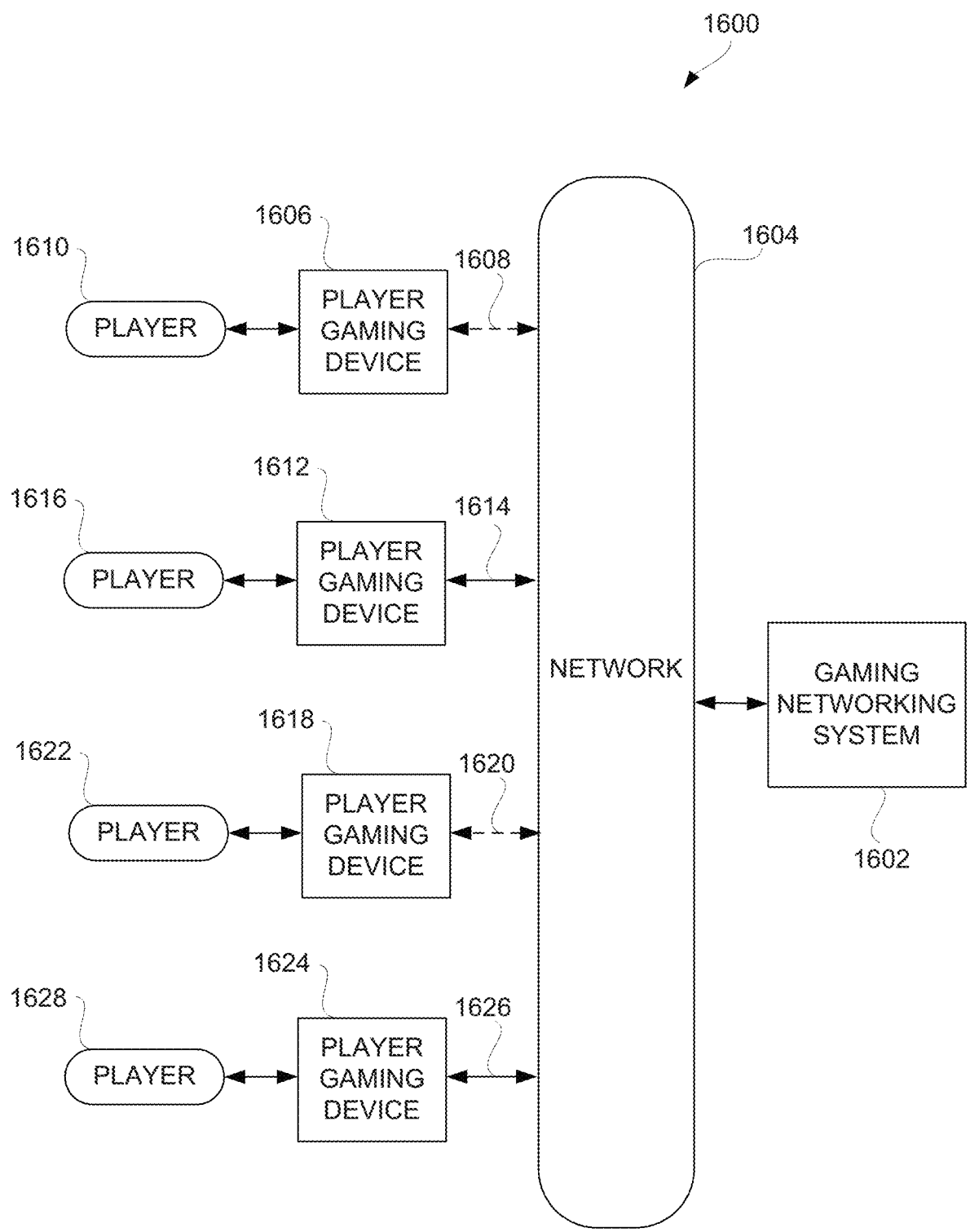
FIG. 16 is a block diagram of an exemplary gaming system according to one embodiment.

FIG. 16 is a block diagram of an exemplary gaming system 1600 according to one embodiment. The gaming system 1600 is one system that can provide support online games for players, including those games covering a large area or terrain. The gaming system 1600 can include a game networking system 1602 that hosts one or more online games for one or more players. The gaming system 100 can also include a network 1604 which facilitates interaction with player gaming devices 1606, 1612, 1618 and 1624. The player gaming device 1606 can be operated by player 1610 and can be coupled to the network 1604 via a network link 1608. The player gaming device 1612 can be operated by player 1616 and can be coupled to the network 1604 via a network link 1614. The player gaming device 1618 can be operated by player 1622 and can be coupled to the network 1604 via a network link 1620. The player gaming device 1624 can be operated by player 1628 and can be coupled to the network 1604 via a network link 1626.

The components of the gaming system 1600 can be connected to each other in any suitable configuration, using any suitable type of connection. The components may be connected directly or over a network 1604, which may be any suitable network. For example, one or more portions of the network 1604 may be an ad hoc network, an intranet, an extra net, a virtual private network (VPN), a local area network LAN), a wireless LAN (WLAN), a short range wireless network (e.g., Bluetooth network), a wide area network WAN), a wireless WAN (WWAN), a metropolitan area network (MAN), a portion of the Internet, a portion of the Public Switched Telephone Network (PSTN), a cellular telephone network, another type of network, or a combination of two or more such networks.

The game networking system 1602 is a network-addressable computing system that can host one or more online games. The game networking system 1602 can generate, store, receive, and transmit game-related data, such as, for example, game account data, game input, game state data, and game displays. The game networking system 1602 can be accessed by the other components of the gaming system 1600 either directly or via the network 1604. Although FIG. 16 illustrates a particular number of players, game networking systems, player gaming devices (e.g., client systems), and networks, one skilled in the art should recognize that any suitable number of players, game networking systems, client systems, and networks can be utilized.

The player gaming devices 1610, 1616, 1622 and 1628 can be used to access, send data to, and receive data from the game networking system 1602, via the network 1604 or via a third-party system. As an example, and not by way of limitation, the player gaming devices 1606, 1612, 1618 and 1624 can be any suitable computing device, such as a personal computer, laptop, gaming console, cellular phone, smartphone, computing tablet, and the like.

The components of gaming system 1600 may be connected to each other using any suitable connections. For example, suitable connections include wireline (such as, for example, Digital Subscriber Line (DSL) or Data Over Cable Service Interface Specification (DOCSIS)), wireless (such as, for example, Wi-Fi, Bluetooth or Worldwide Interoperability for Microwave Access (WiMAX)) or optical (such as, for example, Synchronous Optical Network (SONET) or Synchronous Digital Hierarchy (SDH)) connections. In particular embodiments, one or more connections each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Further, the connections need not necessarily be the same throughout system. One or more first connections may differ in one or more respects from one or more second connections. Although FIG. 16 illustrates particular connections between players 1610, 1616, 1622, 1628, the game networking system 1602, the player gaming devices 1606, 1612, 1619 and 1624, and the network 1604, this disclosure contemplates any suitable connections therebetween.

Particular embodiments may operate in a wide area network environment, such as the Internet, including multiple network addressable systems. FIG. 16 illustrates an example network environment, in which various example embodiments may operate. The network 1604 generally represents one or more interconnected networks, over which the systems and hosts described herein can communicate. The network 1604 may include packet-based wide area networks (such as the Internet), private networks, wireless networks, satellite networks, cellular networks, paging networks, and the like.

Figure 17:
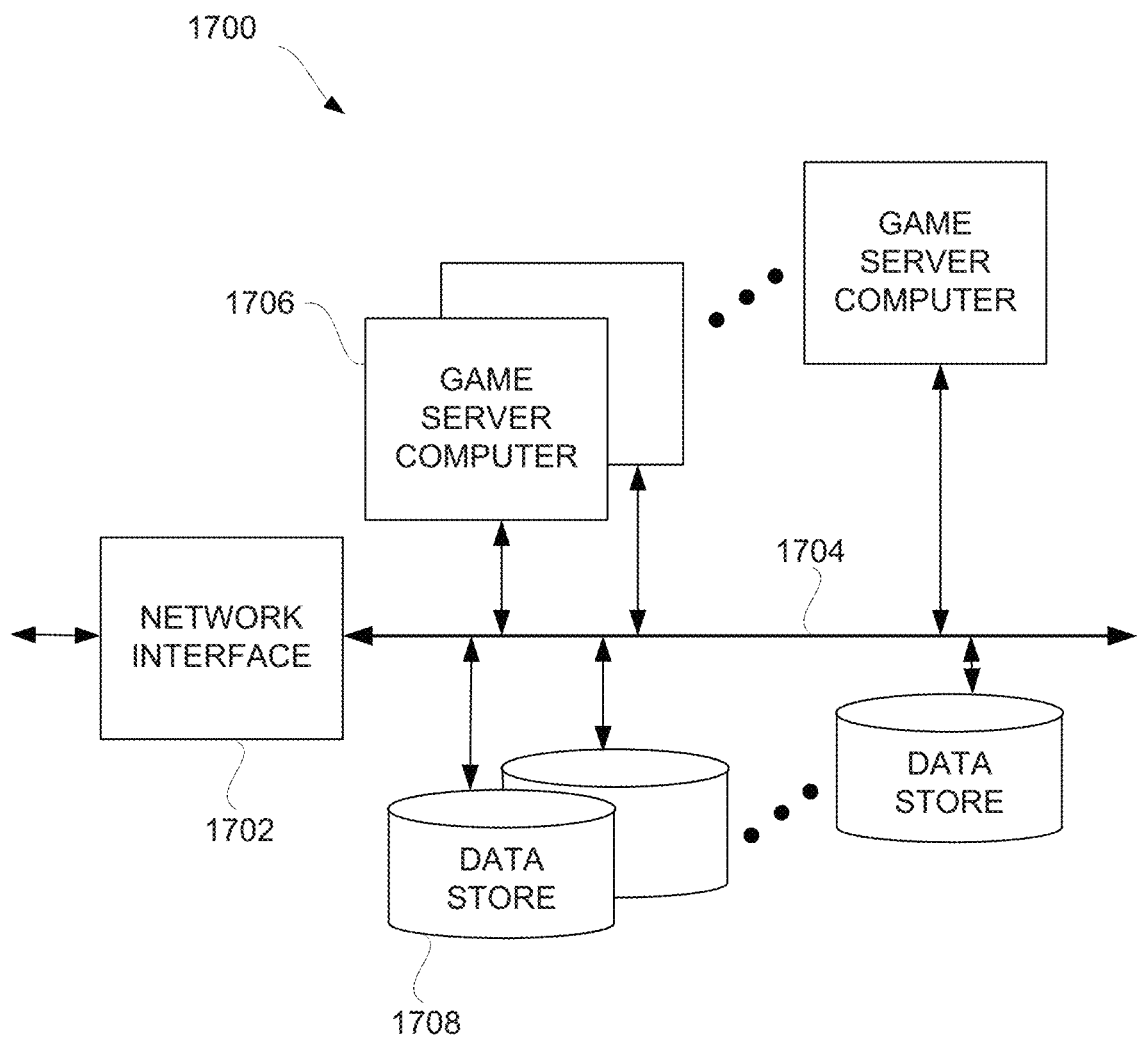
FIG. 17 illustrates a network environment suitable for carrying out one or more embodiments.

FIG. 17 illustrates a network environment 1700 suitable for carrying out one or more embodiments. The network environment 1700 comprises one or more networking systems, such as social networking system, game networking system, and one or more other networking systems. Player gaming devices are operably connected to the network environment 1700 via a network service provider, a wireless carrier, or any other suitable means.

The networking environment 1700 can be a network addressable system that, in various example embodiments, comprises one or more physical servers/computers and data stores. As shown in FIG. 17, the networking environment 1700 can include one or more game server computers 1706 that are operably connected to a network via, by way of example, a network interface 1702. In an example embodiment, the functionality hosted by the one or more game server computers 1706 may include web or HTTP servers, FTP servers, or other servers. The networking environment 1700 can also include one or more data stores 1708. The one or more game server computers 1706, the one or more data stores 1708, and the network interface 1702 can each connect to a local network or data bus 1704.

The one or more game server computers 1706 can host functionality for game play by one or more players which via player gaming devices can interact with the one or more game server computers 1706 over the network (e.g., via the network interface 1702). The one or more data stores 1708 can provide data storage. For example, the one or more data stores can be or include mass storage devices (e.g., hard drive) or databases. The one or more data stores 1708 can store data relating to and/or enabling operation of networking environment 1700. The data stored to the one or more data stores 1708 can include digital data objects or content objects. A data object, in particular embodiments, can pertain to an item of digital information typically stored or embodied in a data file, database, or record. A content object can take many forms, including: text (e.g., ASCII, SGML, HTML), images (e.g., jpeg, tit and git), graphics (vector-based or bitmap), audio, video (e.g. mpeg), or other multimedia, and combinations thereof. The data stored to the one or more data stores 1708 can also include executable code objects (e.g., games executable within a browser window or frame), podcasts, and the like. Logically, the one or more data stores 1708 can correspond to one or more of a variety of separate and integrated databases, such as relational databases and object-oriented databases, that maintain information as an integrated collection of logically related records or files stored on one or more physical systems.

The one or more data stores 1708 can generally include one or more of a large class of data storage and management systems. In particular embodiments, the one or more data stores 1708 can be implemented by any suitable physical system(s) including components, such as one or more data base servers, mass storage media, media library systems, storage area networks, data storage clouds, and the like. In one example embodiment, the one or more data stores 1708 can include one or more servers, databases (e.g., MySQL), and/or data warehouses.

The player gaming devices that connect to the network environment 1700 are generally a computer or computing device including functionality for communicating (e.g., remotely) over a computer network. The player gaming devices can, for example, be a desktop computer, laptop computer, personal digital assistant (PDA), smart phone or other cellular or mobile phone, or mobile gaming device, among other suitable computing devices. The player gaming device can execute one or more client applications. Alternatively, the player gaming device can interact with remote server computer, such as via an application program or a web browser (e.g., Microsoft Internet Explorer, Mozilla Firefox, Apple Safari, Google Chrome, or Opera), to play games and/or access and view data over a computer network.

Figure 18:
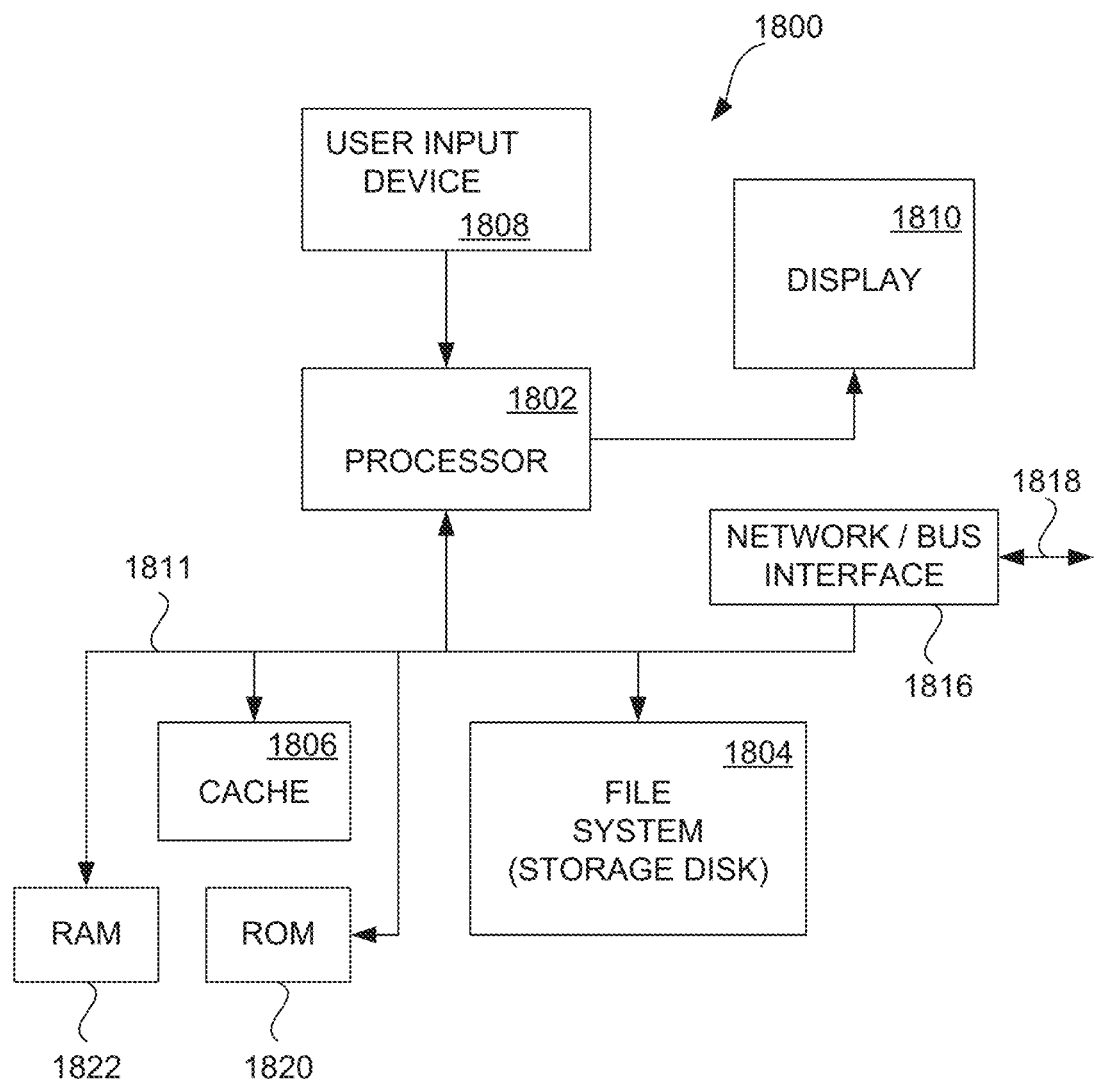
FIG. 18 is a block diagram of an exemplary computing device.

FIG. 18 is a block diagram of an example computing device 1800. The computing device 1800 can be a compute platform, server or computing device used to carry out the various embodiments disclosed herein. The computing device 1800 can include a processor 1802 that pertains to a microprocessor or controller for controlling the overall operation of the computing device 1800. The computing device 1800 can store any type of data and information as discussed above in a file system 1804 and a cache 1806. The file system 1804 is, typically, a storage disk or a plurality of disks, and/or solid-state Flash drive. The file system 1804 typically provides high capacity storage capability for the computing device 1800. However, since the access time to the file system 1804 is relatively slow, the computing device 1800 can also include a cache 1806. The cache 1806 is, for example, Random-Access Memory (RAM) provided by semiconductor memory. The relative access time to the cache 1806 is substantially shorter than for the file system 1804. However, the cache 1806 does not have the large storage capacity of the file system 1804. Further, the file system 1804, when active, consumes more power than does the cache 1806. The computing device 1800 also includes a RAM 1820 and a Read-Only Memory (ROM) 1822. The ROM 1822 can store programs, utilities or processes to be executed in a non-volatile manner. The RAM 1820 provides volatile data storage, such as for the cache 1806.

The computing system 1800 also includes a user input device 1808 that allows a user of the computing system 1800 to interact with the computing system 1800. For example, the user input device 1808 can take a variety of forms, such as a button, keypad, touch screen, dial, and the like. Still further, the computing system 1800 includes a display 1810 (screen display) that can be controlled by the processor 1802 to display information to the user. A data bus 1811 can facilitate data transfer between at least the file system 1804, the cache 1806, the processor 1802, and the CODEC 1812.

The computing system 1800 can also include a network/bus interface 1816 that couples to a data link 1818. The data link 1818 allows the computing system 1800 to couple to a host computer or data network, such as the Internet. The data link 1818 can be provided over a wired connection or a wireless connection. In the case of a wireless connection, the network/bus interface 1816 can include a wireless transceiver.

The various aspects, features, embodiments or implementations of the invention described above can be used alone or in various combinations. The invention can be used with any network, including a local, wide-area, and/or global network. The invention can also be used on a stand-alone computing device without any network connection or with only infrequent connection to a network.

The invention can be implemented in software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over a network coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for producing a graphical environment for a computer game played by at least one player, the method comprising:
retrieving a player position relative to a basemap, the basemap being a reduced resolution representation of the graphical environment;
partitioning the basemap into a plurality of distinct regions using a partitioning algorithm;
identifying a subset of the basemap that is proximate to the player position relative to the basemap, wherein the subset of the basemap includes one or more of the plurality of distinct regions but less than half of the plurality of distinct regions;
increasing resolution of the subset of the basemap using a previously trained machine learning agent to produce an enhanced basemap, the enhanced basemap being an enhanced resolution representation of the graphical environment; and
rendering the enhanced basemap to produce at least a portion of the graphical environment for the computer game;
wherein each of the plurality of distinct regions includes at least one tile.

2. A method as recited in claim 1, wherein the method further comprises subdividing each of the at least one tile of each of the plurality of distinct regions into multiple tiles if a separation distance between the player position and the at least one tile is less than a predetermined threshold amount.

3. A method as recited in claim 2, wherein the increasing resolution of the subset of the basemap operates to increase resolution for a given one of the tiles to a resolution level that is dependent on a separation distance from the position of the given tile to the player position.

4. A method as recited in claim 2, wherein the increasing resolution of the subset of the basemap operates to increase resolution to multiple levels of increasing resolution, dependent on a distance between the player position and a tile position of the corresponding tile.

5. A method as recited in claim 2, wherein a number of tiles that each of the at least one tile is subdivided into is dependent on the separation distance.

6. A method as recited in claim 5, wherein the number of tiles is determined by a subdivision algorithm.

7. A method as recited in claim 2, wherein partitioning the basemap into a plurality of distinct regions and subdividing each of the at least one tile of each of the plurality of distinct regions operates to split the basemap into tiles of different dimensions.

8. A method as recited in claim 2, wherein the increasing resolution of the subset of the basemap operates to increase resolution on a tile-by-tile basis using different, separately trained machine learning agents.

9. A method as recited in claim 8, wherein the separately trained machine learning agents include a resolution enhancement agent, a population agent, and a ground coverage agent.

10. A method as recited in claim 1, wherein the increasing resolution of the subset of the basemap operates to increase resolution on a tile-by-tile basis depending on whether the position of the given tile is less than a separation distance from the player position.

11. A method as recited in claim 1,
wherein the basemap has a base resolution, and
wherein the increasing resolution of the subset of the basemap operates to increase resolution of a first portion of the subset of the basemap to a first increased resolution greater than the base resolution, and to increase resolution of a second portion of the subset of the basemap to a second increased resolution greater than the base resolution and the first increased resolution.

12. A method as recited in claim 1, wherein the previously trained machine learning agent was trained using a training dataset that is generated procedurally following a set of artist-defined rules.

13. A method as recited in claim 12, wherein the training dataset includes a plurality of automatically generated maps, and wherein the training allows specific features of the generated maps to be automatically learned.

14. A method as recited in claim 12, wherein the set of artist-defined rules include rules for procedural landscape generation and population model.

15. A method as recited in claim 12,
wherein the basemap pertains to a terrain for the graphical environment, and
wherein the training dataset includes training maps storing information on ground elevation and on what covers the ground.

16. A method as recited in claim 15, wherein at least one of the training maps includes data on location of streams and water bodies within the terrain.

17. A method as recited in claim 15, wherein at least one of the training maps includes data concerning how different textures are combined.

18. A method as recited in claim 12, wherein the training dataset is custom for a specific terrain.

19. A method as recited in claim 1,
wherein the previously trained machine learning agent was trained using a training dataset, and
wherein the training of the previously trained machine learning agent includes:
receiving elevation data, ground coverage masks, and resolution information that are applicable to a map region; and
outputting an increased-resolution version of the map region characterized by elevation data and masks.

20. A method as recited in claim 1, wherein the partitioning includes quadtree partitioning.

21. A method as recited in claim 1, wherein each of the plurality of distinct regions has a different resolution.

22. A non-transitory computer readable medium including at least computer program code tangibly stored thereon and executable by an electronic device to produce a graphical environment for a computer game played by at least one player, the computer readable medium comprising:
computer program code for retrieving a player position relative to a map, the map being a reduced resolution representation of the graphical environment;
computer program code for partitioning the map into a plurality of distinct regions using a partitioning algorithm;
computer program code for identifying a subset of the map that is proximate to the player position relative to the map, wherein the subset of the map includes one or more of the plurality of distinct regions but less than half of the plurality of distinct regions;
computer program code for increasing resolution of the subset of the map using a previously trained machine learning agent to produce an enhanced map, the enhanced map being an enhanced resolution representation of the graphical environment; and
computer program code for rendering the enhanced map to produce at least a portion of the graphical environment for the computer game;
wherein each of the plurality of distinct regions includes at least one tile.

* * * * *